United States Patent
Fu et al.

(10) Patent No.: US 11,417,158 B2
(45) Date of Patent: Aug. 16, 2022

(54) INFORMATION PROMPTING METHOD, APPARATUS, AND SYSTEM, AND INTELLIGENT ELECTRONIC DOOR LOCK

(71) Applicant: HANGZHOU HIKVISION DIGITAL TECHNOLOGY CO., LTD., Hangzhou (CN)

(72) Inventors: Anyang Fu, Hangzhou (CN); Anqiang Du, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/763,403

(22) PCT Filed: Aug. 3, 2018

(86) PCT No.: PCT/CN2018/098596
§ 371 (c)(1),
(2) Date: May 12, 2020

(87) PCT Pub. No.: WO2019/095728
PCT Pub. Date: May 23, 2019

(65) Prior Publication Data
US 2020/0320809 A1    Oct. 8, 2020

(30) Foreign Application Priority Data

Nov. 16, 2017    (CN) .......................... 201711136710.7

(51) Int. Cl.
*G08B 21/00* (2006.01)
*G07C 9/00* (2020.01)
(Continued)

(52) U.S. Cl.
CPC ......... *G07C 9/00309* (2013.01); *G06V 40/20* (2022.01); *H04L 61/6022* (2013.01);
(Continued)

(58) Field of Classification Search
CPC ...... G07C 9/00309; G07C 2009/00428; G07C 2009/00507; G07C 9/00563; G07C 9/00944; G06K 9/00335; H04L 61/6022
(Continued)

(56) References Cited

U.S. PATENT DOCUMENTS

2013/0017812 A1 * 1/2013 Foster .................... H04N 7/186
455/417
2013/0176107 A1 * 7/2013 Dumas ............... G07C 9/00571
340/5.61
(Continued)

FOREIGN PATENT DOCUMENTS

CN    102646295    8/2012
CN    104318643    1/2015
(Continued)

OTHER PUBLICATIONS

Extended European Search Report issued in Corresponding European Application No. 18878855.8, dated Dec. 3, 2020.
(Continued)

*Primary Examiner* — Mark S Rushing
(74) *Attorney, Agent, or Firm* — Norton Rose Fulbright US LLP

(57) ABSTRACT

A method, apparatus and system for information prompt, and an intelligent electronic door lock are provided. The method includes: when detecting that an intelligent electronic door lock performs an operation for unlocking a door,
(Continued)

determining a target user behavior type corresponding to the operation for unlocking the door, obtains target user concern data corresponding to the target user behavior type, and generates to-be-output prompt information based on the target user concern data; wherein, the prompt information is configured for prompting a user to perform a target behavior or displaying the target user concern data, and the target behavior is a behavior corresponding to the target user concern data; and outputting the prompt information. The problem that the intelligent door lock system has a single humanized function may be solved.

17 Claims, 6 Drawing Sheets

(51) Int. Cl.
*H04L 101/622* (2022.01)
*G06V 40/20* (2022.01)

(52) U.S. Cl.
CPC .............. *G07C 2009/00428* (2013.01); *G07C 2009/00507* (2013.01)

(58) Field of Classification Search
USPC .......................................................... 340/5.2
See application file for complete search history.

(56) References Cited

U.S. PATENT DOCUMENTS

| | | | |
|---|---|---|---|
| 2016/0042582 A1* | 2/2016 | Hyde | E05B 47/00 70/53 |
| 2016/0189454 A1* | 6/2016 | Johnson | G07C 9/00571 340/5.61 |
| 2017/0034485 A1* | 2/2017 | Scalisi | H04N 7/186 |
| 2017/0175419 A1* | 6/2017 | Chiu | E05B 39/04 |

FOREIGN PATENT DOCUMENTS

| | | | | |
|---|---|---|---|---|
| CN | 204946284 | | 1/2016 | |
| CN | 205224861 | | 5/2016 | |
| CN | 105761409 | | 7/2016 | |
| CN | 106121370 | | 11/2016 | |
| CN | 106600768 | | 4/2017 | |
| CN | 206282375 | | 6/2017 | |
| CN | 107170212 | | 9/2017 | |
| CN | 107230268 | * | 10/2017 | .............. G07C 9/00 |
| CN | 206584438 | | 10/2017 | |
| CN | 107327261 A | * | 11/2017 | |

OTHER PUBLICATIONS

International Search Report and Written Opinion issued in corresponding PCT Application No. PCT/CN2018/098596, dated Nov. 13, 2018 (English Translation Provided).

* cited by examiner

INFORMATION PROMPTING METHOD, APPARATUS, AND SYSTEM, AND INTELLIGENT ELECTRONIC DOOR LOCK

CROSS REFERENCE TO RELATED APPLICATIONS

The present application is a national phase application under 35 U.S.C. § 371 of International Application No. PCT/CN2018/098596, filed Aug. 3, 2018, which claims the benefit of priority to Chinese Patent Application No. 201711136710.7, filed with the China National Intellectual Property Administration on Nov. 16, 2017 and entitled "Method, Apparatus, and System for Information prompt, and Intelligent Electronic Door Lock", each of which are incorporated herein by reference in their entirety.

TECHNICAL FIELD

The present application relates to the field of security technology, and in particular, to a method, apparatus and system for information prompt, and an intelligent electronic door lock.

BACKGROUND

In the field of security guard technology, an intelligent door lock system for security guard is more and more widely applied. For the intelligent door lock system, operations for opening and locking a door may be performed independently by an intelligent electronic door lock in the intelligent door lock system, that is, the control function of the entire intelligent door lock system may be implemented independently by the intelligent electronic door lock. Alternatively, the control function of the entire intelligent door lock system may be completed cooperatively by the intelligent electronic door lock and a corresponding server device.

At present, the intelligent door lock system usually provides a prompt when the intelligent electronic door lock is abnormally opened and closed, and thus has a single humanized function. For example, when a circuit in the intelligent electronic door lock is damaged, the intelligent electronic door lock and the relevant server device will provide the prompt. However, when a user goes out, there may be a case that the user forgets to carry articles with him or her. For this case, the intelligent electronic door lock and the relevant server device cannot provide the prompt. Accordingly, the intelligent electronic door lock cannot provide intelligent prompt for an identity of the user and the time of entering or leaving the door, and thus cannot meet the growing demand from users for safer and more comfortable home life.

SUMMARY

In view of this, embodiments of the present application provide a method, apparatus and system for information prompt, and an intelligent electronic door lock, to solve the problem that the intelligent door lock system has the single humanized function. The embodiments of the present application provide the following technical solutions.

In a first aspect, an embodiment of the present application provides a method for information prompt, which is applied to an intelligent door lock system. The method includes:

when detecting that an intelligent electronic door lock performs an operation for unlocking a door, determining a target user behavior type corresponding to the operation for unlocking the door;

obtaining target user concern data corresponding to the target user behavior type;

generating to-be-output prompt information based on the target user concern data; wherein, the prompt information is configured for prompting a user to perform a target behavior or displaying the target user concern data, and the target behavior is a behavior corresponding to the target user concern data; and outputting the prompt information.

In a second aspect, an embodiment of the present application provides an apparatus for information prompt, which is applied to an intelligent door lock system. The apparatus includes:

a behavior type determination unit, configured for: when detecting that an intelligent electronic door lock performs an operation for unlocking a door, determining a target user behavior type corresponding to the operation for unlocking the door;

a user concern data obtaining unit, configured for: obtaining target user concern data corresponding to the target user behavior type;

a prompt information generation unit, configured for: generating to-be-output prompt information based on the target user concern data; wherein, the prompt information is configured for prompting a user to perform a target behavior or displaying the target user concern data, and the target behavior is a behavior corresponding to the target user concern data; and a prompt information output unit, configured for: outputting the prompt information.

In a third aspect, an embodiment of the present application provides an intelligent electronic door lock, comprising: an internal bus, a memory, a processor, and a communication interface; wherein, the processor, the communication interface and the memory communicate with each other via the internal bus;

wherein, the memory is configured for storing machine-readable instructions for a method for information prompt;

the processor is configured for reading the machine-readable instructions in the memory and executing the machine-readable instructions to perform operations of:

when detecting that the intelligent electronic door lock performs an operation for unlocking a door, determining a target user behavior type corresponding to the operation for unlocking the door;

obtaining target user concern data corresponding to the target user behavior type;

generating to-be-output prompt information based on the target user concern data; wherein, the prompt information is configured for prompting a user to perform a target behavior or displaying the target user concern data, and the target behavior is a behavior corresponding to the target user concern data; and outputting the prompt information.

In a fourth aspect, an embodiment of the present application further provides a system for information prompt. The system for information prompt includes: an intelligent electronic door lock, a gateway device and at least one information acquisition device.

The gateway device is configured for establishing a communication connection between the intelligent electronic door lock and the at least one information acquisition device.

The at least one information acquisition device is configured for acquiring scene information of a scene in which the at least one information acquisition device is located.

The intelligent electronic door lock is configured for:

when it is detected that the intelligent electronic door lock performs an operation for unlocking a door, determining a target user behavior type corresponding to the operation for unlocking the door;

obtaining first-type scene information transmitted by a first-type information acquisition device; wherein, the first-type information acquisition device is an information acquisition device, in the at least one information acquisition device, corresponding to the target user behavior type;

determining the first-type scene information as the target user concern data;

generating to-be-output prompt information based on the target user concern data; wherein, the prompt information is configured for prompting a user to perform a target behavior or displaying the target user concern data, and the target behavior is a behavior corresponding to the target user concern data; and outputting the prompt information.

In a fifth aspect, an embodiment of the present application further provides a system for information prompt. The system for information prompt includes: an intelligent electronic door lock, a gateway device and at least one information acquisition device.

The gateway device is configured for establishing a communication connection between the intelligent electronic door lock and the at least one information acquisition device.

The at least one information acquisition device is configured for acquiring scene information of a scene in which the at least one information acquisition device is located.

The intelligent electronic door lock is configured for:

when it is detected that the intelligent electronic door lock performs an operation for unlocking a door, determining a target user behavior type corresponding to the operation for unlocking the door;

determining target user concern data corresponding to the target user behavior type from a correspondence between user behavior types and user concern data;

generating to-be-output prompt information based on the target user concern data; wherein, the prompt information is configured for prompting a user to perform a target behavior or displaying the target user concern data, and the target behavior is a behavior corresponding to the target user concern data;

obtaining second-type scene information transmitted by a second-type information acquisition device; wherein, the second-type information acquisition device is an information acquisition device, in the at least one information acquisition device, corresponding to the target user behavior type; and outputting the second-type scene information and the prompt information.

In a sixth aspect, an embodiment of the present application provides a machine-readable storage medium for storing a computer program therein. The computer program is executed by a processor, so as to cause the processor to perform the above any one method for information prompt.

In a seventh aspect, an embodiment of the present application provides a computer program. The computer program is executed by a processor, so as to cause the processor to perform the above any one method for information prompt.

In the solution provided by the embodiment of the present application, when detecting that an intelligent electronic door lock performs an operation for unlocking a door, the intelligent door lock system determines a target user behavior type corresponding to the operation for unlocking the door; obtains target user concern data corresponding to the target user behavior type; and then generates and outputs prompt information based on the target user concern data; wherein, the prompt information is configured for prompting a user to perform a target behavior or displaying the target user concern data, and the target behavior is a behavior corresponding to the target user concern data. It can be seen that in the solution provided by the embodiment of the present application, an information prompt function for the user concern data is added to the intelligent door lock system, thereby adding humanized functions, and solving the problem that the intelligent door lock system has the single humanized function.

DETAILED DESCRIPTION

Figure 1:
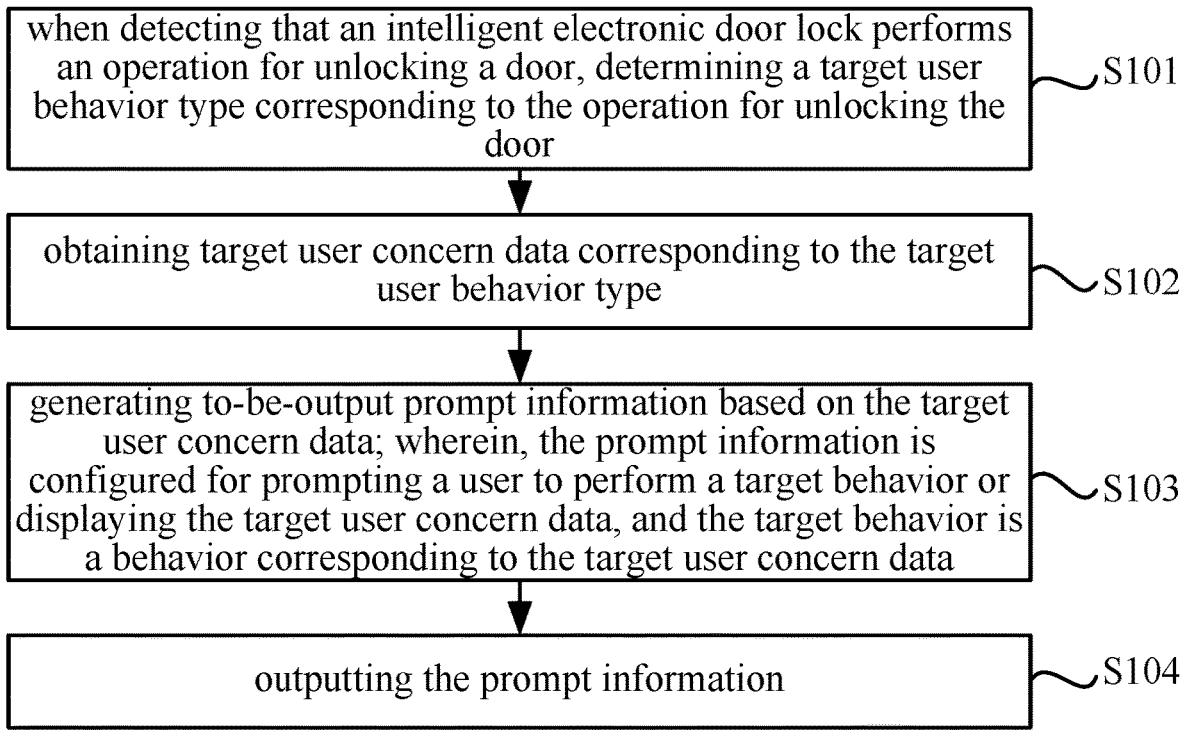
FIG. 1 is a flowchart of a method for information prompt shown in an exemplary embodiment of the present application.

Exemplary embodiments will be described in detail herein, examples of which are illustrated in the drawings. In the following description, the same number in different drawings represents the same or similar element unless otherwise indicated. The implementations described in the following exemplary embodiments are only examples of apparatuses and methods consistent with some aspects of the present application as detailed in the appended claims, and are not all implementations of the present application.

The terms used in the present application are only used for describing particular embodiments and are not intended to limit the present application. In the present application and the appended claims, the singular forms "a", "an" and "the" include plural referents unless the context clearly dictates otherwise. It should also be understood that the term "and/or" as used herein refers to any or all possible combinations that include one or more associated listed items.

It should be understood that the terms such as "first", "second", "third" and the like, which are used to describe various information in the present application, are only used to distinguish the same type of information, but do not limit the information. For example, the first information may also be referred to as the second information, and the second information may also be referred to as the first information, without departing from the scope of the present application. Depending on the context, the term "if" as used herein may be interpreted as "when" or "in response to determining . . . ".

In real life, when a user gets home or goes out, he or she usually forgets something or needs to be reminded of something. For example, old people may be forgetful, and thus often forget to take medicine or forget that a gas stove in a kitchen is still turned on when going out; or, the child comes home late, and thus the parent wants to be reminded of the time that the child enters the door; and so on. In view of the foregoing cases, embodiments of the present application provide a method, apparatus and system for information prompt, and an intelligent electronic door lock, which add a humanized function by adding an information prompt function for user concern data, and thus solve the problem of the single humanized function of the intelligent door lock system.

The method for information prompt according to an embodiment of the present application is firstly introduced below.

In the embodiment of the present application, the intelligent door lock system may be composed of an intelligent electronic door lock, or may be composed of an intelligent electronic door lock and a server device. The intelligent door lock system has a control function. If the intelligent door lock system is composed of an intelligent electronic door lock, the control function of the intelligent door lock system is independently implemented by the intelligent electronic door lock. If the intelligent door lock system is composed of an intelligent electronic door lock and a server device, the control function of the intelligent door lock system is implemented cooperatively by the intelligent electronic door lock and the corresponding server device.

The intelligent door lock system further includes an apparatus for information prompt, which is a functional software. If the intelligent door lock system is composed of the intelligent electronic door lock, the apparatus for information prompt runs on the intelligent electronic door lock. If the intelligent door lock system is composed of the intelligent electronic door lock and the server device, the apparatus for information prompt may run on the intelligent electronic door lock or in the server device.

In the embodiment of the present application, the intelligent door lock system including the apparatus for information prompt may also be referred to as a system for information prompt. That is, the system for information prompt is a system obtained by improving the intelligent door lock system.

The method for information prompt provided in the embodiment of the present application is applied to the intelligent door lock system. Specifically, the method for information prompt may be performed by the apparatus for information prompt. For the case where the control function of the intelligent door lock system is independently implemented by the intelligent electronic door lock, the apparatus for information prompt may be a functional software operating in the intelligent electronic door lock. For the case where the control function of the intelligent door lock system is implemented cooperatively by the intelligent electronic door lock and the corresponding server device, the apparatus for information prompt may be a functional software operating in the intelligent electronic door lock or in the server device. The password input of the intelligent electronic door lock may be implemented by one or more of characters (numbers and/or letters), fingerprints, voices, radio frequency cards, and the like, which are not limited in the embodiment of the present application.

As shown in FIG. 1, a method for information prompt provided by an embodiment of the present application includes S101-S104.

At S101, when it is detected that an intelligent electronic door lock performs an operation for unlocking a door, a target user behavior type corresponding to the operation for unlocking the door is determined.

The target user behavior type is a user entering the door or a user going out the door.

When it is detected that the intelligent electronic door lock performs an operation for unlocking a door, it indicates that a user will go out the door or a user will enter the door. Since a user's concern at the time of going out the door is different from a user's concern at the time of entering the door, when it is detected that the intelligent electronic door lock performs an operation for unlocking a door, the apparatus for information prompt may firstly determine the target user behavior type corresponding to the operation for unlocking the door, and subsequently provides different information prompts based on different user behavior types of user behaviors.

In the embodiment of the present application, there are multiple implementations for determining the target user behavior type corresponding to the operation for unlocking the door. Optionally, the step of determining a target user behavior type corresponding to the operation for unlocking the door may include:

when the operation for unlocking the door is a first predetermined operation, or when an image acquisition module associated with the intelligent door lock system identifies first predetermined information, determining that the target user behavior type corresponding to the operation for unlocking the door is the user entering the door; wherein, the first predetermined operation is an operation performed when an exterior lock of the intelligent electronic door lock acquires data and the data is verified successfully; and the first predetermined information is: an image in which the user is located outside the door before the operation for unlocking the door is performed; and when the operation for unlocking the door is a second predetermined operation, or when the image acquisition module associated with the intelligent door lock system identifies second predetermined information, determining that the target user behavior type corresponding to the operation for unlocking the door is the user going out the door; wherein, the second predetermined operation is an operation that is triggered by a handle of an inner lock of the intelligent electronic door lock; and the second predetermined information is an image in which the user is located outside the door after the operation for unlocking the door is performed.

It can be understood that in order to cause the user to enter the door, the exterior lock of the intelligent electronic door lock needs to be operated to trigger the operation for unlocking the door. Specifically, the user inputs to-be-identified data in an input interface on the exterior lock of the intelligent electronic door lock; an information detection module in the exterior lock can acquire the to-be-identified data; and after the to-be-identified data is successfully verified, the intelligent electronic door lock performs the operation for unlocking the door. Therefore, when the operation for unlocking the door is the operation that is performed when the exterior lock of the intelligent electronic door lock acquires data and the data is verified successfully, it is determined that the target behavior type corresponding to the operation for opening the door is the user entering the door. The verification method involved by the intelligent electronic door lock when unlocking the door includes, but is not limited to: a face identification, a voiceprint identification, a fingerprint identification, a finger vein identification, a palmprint identification, a password input, a mobile terminal control (such as identifying a MAC (Media Access Control) address of the mobile terminal), a RF card and so on. Different types of to-be-identified data correspond to different verification methods.

In order to go out the door, the user may trigger the operation for unlocking the door by the handle of the inner lock of the intelligent electronic door lock. Therefore, if the operation for unlocking the door is an operation triggered by the handle of the inner lock of the intelligent electronic door lock, it can be determined that the target user behavior type corresponding to the operation for unlocking the door is the user going out the door.

Of course, if the intelligent door lock system is associated with an image acquisition module, when the image acquisition module identifies that the user is located outside the door before the operation for unlocking the door is performed, it may be determined that the target user behavior type corresponding to the operation for unlocking the door is the user entering the door; and when the image acquisition module identifies that the user is located outside the door after the operation for unlocking the door is performed, it may be determined that the target user behavior type corresponding to the operation for unlocking the door is the user going out the door. In the embodiment of the present application, regardless of whether an image acquisition module is built into the intelligent electronic door lock, or is connected with the intelligent electronic door lock, such as a camera installed at the door, or communicates with the server device, the image acquisition module may be considered to be associated with the intelligent door lock system.

Those skilled in the art can understand that whether the door is unlocked may be detected by a square tongue, an oblique tongue, a stop tongue and/or a door magnet of the intelligent electronic door lock, that is, whether the intelligent electronic door lock performs the operation for unlocking the door is detected by the square tongue, the oblique tongue, the stop tongue and/or the door magnet of the intelligent electronic door lock.

At S102, target user concern data corresponding to the target user behavior type is obtained.

After the target user behavior type is determined, in order to provide the user with data related to an attention point corresponding to the target user behavior type, the apparatus for information prompt may obtain the target user concern data corresponding to the target user behavior type, and then perform subsequent data processing.

The target user concern data may be set by a user or a system; the target user concern data may also be real-time data acquired; and so on. The data type of the target user concern data includes, but is not limited to, a voice, a text, a picture, and so on.

For clarity, how to obtain the target user concern data corresponding to the target user behavior type is described in detail with respect to specific embodiments.

At S103, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

Specifically, the step of generating the to-be-output prompt information based on the target user concern data may include: determining the target user concern data as the to-be-output prompt information; or, generating prompt information containing the target user concern data; or, determining a target behavior corresponding to the target user concern data, and generating prompt information for prompting the user to perform the target behavior.

In the embodiment of the present application, since there are multiple types of user concern data, the prompt information may contain various contents.

At S104, the prompt information is output.

There may be multiple manners for outputting the prompt information. The manner for outputting the prompt information may be default in the system or set by the user.

Optionally, in an implementation, the prompt information may directly output by a voice output module of the intelligent door lock system. For example, the voice output module may be a speaker of the intelligent electronic door lock in the intelligent door lock system, or other sound devices.

Optionally, in another implementation, the apparatus for information prompt may output the prompt information to an associated mobile terminal. For example, the apparatus for information prompt may output the prompt information to the associated mobile terminal in the form of a short message, an email, a dedicated client software, and the like.

In the solution provided by the embodiment of the present application, when detecting that an intelligent electronic door lock performs an operation for unlocking a door, the intelligent door lock system determines a target user behavior type corresponding to the operation for unlocking the door; obtains target user concern data corresponding to the target user behavior type; and generates and outputs prompt information based on the target user concern data; wherein, the prompt information is configured for prompting a user to perform a target behavior or displaying the target user concern data, and the target behavior is a behavior corresponding to the target user concern data. It can be seen that in the solution provided by the embodiment of the present application, an information prompt function for the user concern data is added to the intelligent door lock system, thereby adding humanized functions, and solving the problem that the intelligent door lock system has the single humanized function.

The method for information prompt of the present application is introduced with respect to a specific embodiment.

The method for information prompt according to the embodiment of the present application is applied to the intelligent door lock system. Specifically, the method for information prompt may be performed by an apparatus for information prompt. A specific device on which the apparatus for information prompt runs refers to related descriptions in the foregoing embodiment including S101-S104.

The intelligent door lock system may be associated with at least one information acquisition device via a gateway device. The information acquisition device includes, but is not limited to, a humidity sensor for detecting humidity, a temperature sensor for detecting a temperature, a camera for acquiring image information, a smoke sensor for detecting a smoke concentration, a fuel gas sensor for detecting a fuel gas concentration, and the like. The gateway device may be, for example, a switch, a router and the like. It can be understood that the at least one information acquisition device is in communication with the device on which the apparatus for information prompt runs, so that the apparatus for information prompt can obtain required information from the at least one information acquisition device during information prompting.

Figure 2:
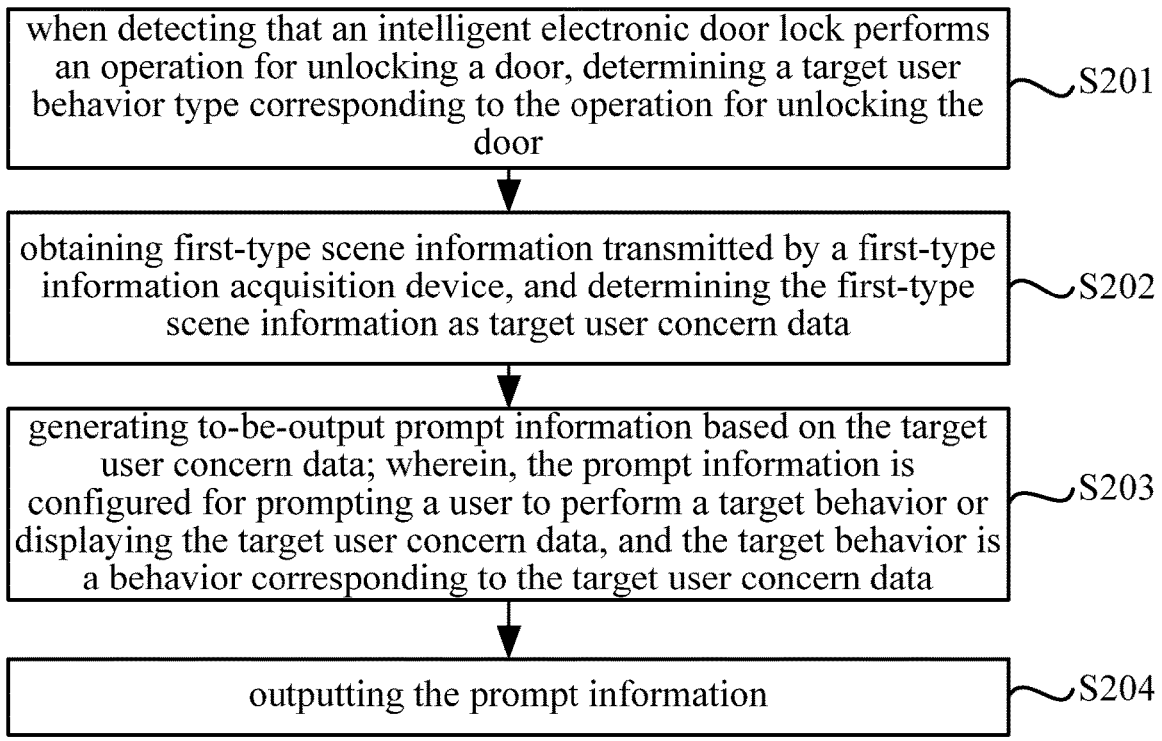
FIG. 2 is a flowchart of a method for information prompt shown in another exemplary embodiment of the present application.

As shown in FIG. 2, an embodiment of the present application provides a method for information prompt. The method includes S201-S204.

At S201, when it is detected that an electronic door lock performs an operation for unlocking a door, a target user behavior type corresponding to the operation for unlocking the door is determined.

The target user behavior type is a user entering the door or a user going out the door. The electronic door lock is the intelligent electronic door lock.

In this embodiment, S201 is the same as S101 in the above embodiment, and will be not described in detail herein.

At S202, first-type scene information transmitted by a first-type information acquisition device is obtained, and the first-type scene information is determined as the target user concern data; wherein, the first-type information acquisition device is an information acquisition device corresponding to the target user behavior type.

After determining the target user behavior type, for subsequent information prompt, the apparatus for information prompt may obtain the first-type scene information transmitted by the first-type information acquisition device, and determine the first-type scene information as the target user concern data.

In this embodiment, information acquired by the information acquisition device is called the scene information. Specifically, when the information acquisition device is the temperature sensor, the scene information is the temperature information. When the information acquisition device is the humidity sensor, the scene information is the humidity information. When the information acquisition device is the camera, the scene information is the image information. When the information acquisition device is the smoke sensor, the scene information is the smoke concentration. When the information acquisition device is the fuel gas sensor, the scene information is the fuel gas concentration.

It can be understood that the first-type information acquisition device may acquire information in real time. Then, when detecting that the intelligent electronic door lock performs the operation for unlocking the door, the apparatus for information prompt may request the acquired first-type scene information from the first-type information acquisition device. Accordingly, after receiving the request, the first-type information acquisition device may feed beak the latest acquired first-type scene information to the apparatus for information prompt, or may feed beak the latest first-type scene information to the apparatus for information prompt only when determining that the latest first-type scene information meets a preset alarm condition.

Of course, the first-type information acquisition device may also acquire the scene information after receiving the request from the apparatus for information prompt. The first-type information acquisition device may feed beak the acquired first-type scene information to the apparatus for information prompt, or may feed beak the first-type scene information to the apparatus for information prompt only when determining that the acquired first-type scene information meets the preset alarm condition.

In the embodiment of the present application, when the apparatus for information prompt does not obtain the first-type scene information transmitted by the first-type information acquisition device, the apparatus for information prompt may end the processing flow.

In addition, regardless of whether the user goes out the door or enters the door, scene information acquired by all of the information acquisition devices may be used as data concerned by the user. At this time, first-type information acquisition devices are all information acquisition devices that communicate with the apparatus for information prompt.

In specific applications, since the user's concerns when the user goes out the door or enters the door are different, in order to avoid the problem of low transmission efficiency caused by too much information, it is possible to establish the correspondence between some information acquisition devices and the behavior of the user going out the door, and the correspondence between the other information acquisition devices and the behavior of the user entering the door. In this way, when the user goes out the door or the user enters the door, the scene information acquired by different information acquisition devices is taken as the data concerned by the user. Each of the information acquisition devices is configured for acquiring the data, concerned by the user, of the user behavior type corresponding to the information acquisition device. If the user behavior type corresponding to one information acquisition device is the target user behavior type, the scene information acquired by the information acquisition device is the target user concern data.

For example, when a user goes out the door, he or she is more concerned about the temperature, the humidity and whether the fuel gas has been turned off; and when a user enters the door, he or she is more concerned about whether a dangerous event occurs indoors, such as, people intrusion, the falling of old people or the loss of items, and whether there is the leakage of the fuel gas or the smoke. Thus, the correspondence between the behavior of the user going out the door and the fuel gas sensor, the temperature sensor and the humidity sensor may be pre-established, and the correspondence between the behavior of the user entering the door and the camera, the smoke sensor and the fuel gas sensor may be pre-established. In this way, when the target user behavior type is the user going out the door, the first-type information acquisition device is the fuel gas sensor, the temperature sensor and the humidity sensor. When the target user behavior type is the user entering the door, the first-type information acquisition device is the camera, the smoke sensor and the fuel gas sensor.

At S203, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

In the embodiment of the present application, the apparatus for information prompt may directly determine the first-type scene information as the prompt information, or take information containing the first-type scene information as the prompt information, or, determine the target behavior that is to be performed by the user based on the first-type scene information, and generate the prompt information for prompting the user to perform the target behavior. Here, the specific content of the prompt information may be set by the user himself or herself or be set by the system in specific applications.

For example, if the user goes out the door, and the determined first-type information acquisition device is the smoke sensor, the first-type scene information is the smoke concentration. At this time, the prompt information may be: "Smoke concentration", or "Please note that the smoke is detected indoors", or "Please pay attention to check the indoor smoke" and so on.

At S204, the prompt information is output.

S204 in the present embodiment is the same as S104 in the above embodiment, and will be not described in detail herein.

In the solution provided by the embodiment of the present application, when it is detected that an intelligent electronic door lock performs an operation for unlocking a door, a target user behavior type corresponding to the operation for unlocking the door is determined, and target user concern data, i.e., the first-type scene information, corresponding to the target user behavior type is obtained; based on the target user concern data, a prompt information is generated and output. It can be seen that in the solution provided by the embodiment of the present application, an information prompt function for the user concern data belonging to the scene information is added to the intelligent door lock system, thereby adding humanized functions, and solving the problem that the intelligent door lock system has the single humanized function.

The method for information prompt of the present application is introduced with respect to another specific embodiment below.

The method for information prompt according to the embodiment of the present application is applied to an intelligent door lock system. Specifically, the method for information prompt may be performed by an apparatus for information prompt. The specific device on which the apparatus for information prompt runs refers to related descriptions in the foregoing embodiment including S101-S104.

Figure 3:
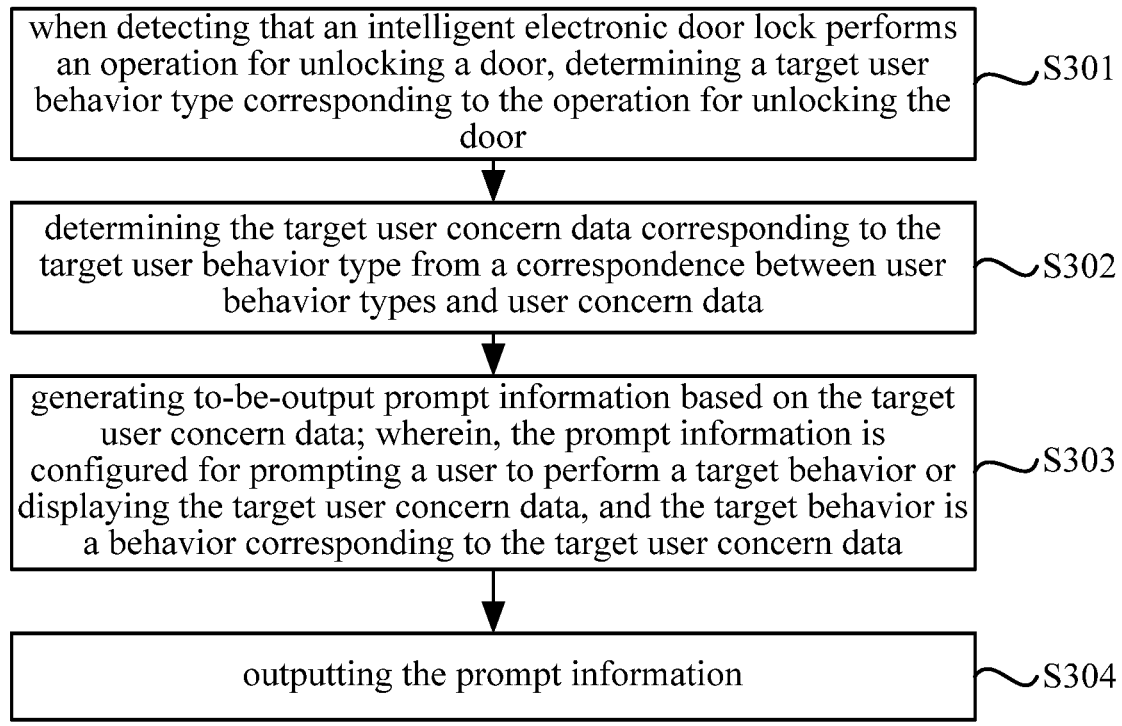
FIG. 3 is a flowchart of a method for information prompt shown in another exemplary embodiment of the present application.

As shown in FIG. 3, an embodiment of the present application provides a method for information prompt. The method includes S301-S304.

At S301, when it is detected that an intelligent electronic door lock performs an operation for unlocking a door, a target user behavior type corresponding to the operation for unlocking the door is determined.

The target user behavior type is the user entering the door or the user going out the door.

S301 in the present embodiment is the same as S101 in the above embodiment, and will be not described in detail herein.

At S302, the target user concern data corresponding to the target user behavior type is determined from the correspondence between user behavior types and user concern data.

Since the user's concerns when the user goes out the door are different from the user's concerns when the user enters the door, the correspondence between user behavior types and user concern data may be established based on user requirements. The user concern data may be text, voice, or the like.

In the embodiment of the present application, for the case where the control function of the intelligent door lock system is independently implemented by the intelligent electronic door lock, in establishing the correspondence between user behavior types and user concern data, if the intelligent electronic door lock has a wireless communication module, the user may input information and establish the correspondence through a dedicated client software downloaded in the mobile terminal, and deliver the input information and the correspondence to the intelligent electronic door lock for storing through the wireless communication module. Alternatively, when the user inputs information through the dedicated client software in the mobile terminal, the mobile terminal may store the correspondence. In this way, during information prompting, the intelligent electronic door lock may request to obtain the target user concern data from the mobile terminal. If the intelligent electronic door lock does not have the wireless communication module, the user may input information and establish the correspondence through the local interface of the intelligent electronic door lock, thereby storing the input information and the established correspondence.

In addition, for the case where the control function of the intelligent door lock system is implemented cooperatively by the intelligent electronic door lock and the server device, the correspondence may be stored in the device on which the apparatus for information prompt runs, and the correspondence may also be stored in the server device. Specifically, when the device on which the apparatus for information prompt runs is an intelligent electronic door lock, the input of the information and the establishment of the correspondence may be completed by the intelligent electronic door lock; or, the correspondence may be generated by the mobile terminal and be sent to the intelligent electronic door lock; or the correspondence may be generated by the mobile terminal and be stored in the mobile terminal or the server device. At this time, during information prompting, the intelligent electronic door lock may request to obtain the target user concern data from the device storing the correspondence, and so on. When the device on which the apparatus for information prompt runs is a server device, the correspondence may be generated by the mobile terminal and be sent to the server device; or, the correspondence may be generated by the intelligent electronic door lock and be sent to the server device; or the correspondence may be generated by the server device itself, that is, the user inputs configuration information for the correspondence by logging in the website corresponding to the server device, and then the server device may generate the correspondence based on the configuration information input by the user.

For example, the correspondence between the user behavior types and user concern data in this embodiment may be that: the user going out the door corresponds to: "Pay attention to get everything before going out the door", and, the user entering the door corresponds to: "Do you bring everything back?"; or, the user going out the door corresponds to: "Remember to take medicine before going out the door", and, the user entering the door corresponds to: "Do you bring everything back?"; or, the user going out the door corresponds to: "Pay attention to turn off various electrical appliances before going out the door", and, the user entering the door corresponds to: "Turn up the temperature of the water heater firstly"; and so on.

In the embodiment of the present application, the correspondence between the user behavior types and user concern data may be obtained through manual setting or machine learning. For example, the correspondence is implemented cooperatively by the intelligent electronic door lock of the intelligent door lock system and the associated image acquisition device, and so on.

At S303, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

In the embodiment of the present application, the apparatus for information prompt may directly determine the target user concern data as the prompt information; or take information containing the target user concern data as the prompt information; or, generate the prompt information for prompting the user to perform the target behavior based on the target user concern data. The specific content of the prompt information may be set by the user himself or herself or be set by the system itself based on specific applications.

For example, the target user concern data is "pay attention to get everything before going out the door", and thus the corresponding prompt information is "pay attention to get everything before going out the door"; or, the target user concern data is "various electrical appliances", and thus the corresponding prompt information is "please turn off various electrical appliances"; or, the target user concern data is "medicine", and thus the corresponding prompt information is "please pay attention to the medicine".

At S304, the prompt information is output.

There may be multiple manners for outputting the prompt information. The manner for outputting the prompt information may be default in the system or set by the user.

Optionally, in an implementation, the prompt information may be directly output by a voice output module of the intelligent door lock system. For example, the voice output module may be a speaker in the intelligent electronic door lock in the intelligent door lock system, or other sound devices.

Optionally, in another implementation, the apparatus for information prompt may output the prompt information to an associated mobile terminal. For example, the apparatus for information prompt may output the prompt information to the associated mobile terminal in the form of short message, email, or by dedicated client software, and the like.

In addition, the intelligent door lock system may be associated with at least one information acquisition device via a gateway device. In order to add humanized functions, before the step of outputting the prompt information, the method may further include:

obtaining second-type scene information transmitted by a second-type information acquisition device; wherein, the second-type information acquisition device is an information acquisition device corresponding to the target user behavior type.

The step of outputting the prompt information includes:
outputting the second-type scene information and the prompt information.

The at least one information acquisition device includes, but is not limited to, a humidity sensor, a temperature sensor, a camera, a smoke sensor, a fuel gas sensor, and the like. The gateway device may be, for example, a switch, a router, and the like. It can be understood that the at least one information acquisition device is in communication with the device on which the apparatus for information prompt runs, so that the apparatus for information prompt can obtain the required information from the at least one information acquisition device during information prompting.

In addition, regarding the method for acquiring and reporting information by the second-type information acquisition device, reference may be made to the related content about the first-type information acquisition device in S202. In addition, regarding the relationship between the second-type information acquisition device and all associated information acquisition devices, reference may also be made to the related content about the first-type information acquisition device in S202.

In the embodiment of the present application, the apparatus for information prompt may simultaneously output the second-type scene information and the prompt information to the associated mobile terminal.

In specific applications, the apparatus for information prompt may also output the second-type scene information and the prompt information in sequence. The output sequence of the second-type scene information and the prompt information may be random. In order to improve the user experience, the step of outputting the second-type scene information and the prompt information may include:

determining whether a condition for preferentially outputting scene information is met;

if the condition for preferentially outputting scene information is met, outputting the second-type scene information and the prompt information in a first output order; if the condition for preferentially outputting scene information is not met, outputting the second-type scene information and the prompt information in a second output order; wherein, the first output order is that the second-type scene information is output first and then the prompt information is output; the second output order is that the prompt information is output first and then the second-type scene information is output.

Optionally, in an implementation, determining whether a condition for preferentially outputting scene information is met may include:

determining whether a preset priority corresponding to the second-type information acquisition device is higher than a preset priority corresponding to the prompt information; if the preset priority corresponding to the second-type information acquisition device is higher than the preset priority corresponding to the prompt information, determining that the condition for preferentially outputting scene information is met; if the preset priority corresponding to the second-type information acquisition device is not higher than the preset priority corresponding to the prompt information, determining that the condition for preferentially outputting scene information is not met.

In the embodiment of the present application, the priority corresponding to each information acquisition device and the priority corresponding to the prompt information may be preset. Then, it is determined whether the condition for preferentially outputting scene information is met by comparing the priority of the second-type information acquisition device with the priority of the prompt information. In specific applications, the priorities of the scene information of the smoke sensor and the scene information of the fuel gas sensor may be higher than the priority of the prompt information, because the fact that the smoke sensor or the fuel gas sensor sends the scene information indicates that there may be dangers or safety hazards such as fire hazards and the leakage of the fuel gas indoors. However, the priority of the scene information of the humidity sensor and the temperature sensor may be lower than the priority of the prompt information. If the camera is configured to identify dangers, for example, scene information that endangers personal and property safety, such as people intrusion, the loss of items or the falling of the old people, the priority of the camera is higher than the priority of the prompt information.

Optionally, in another implementation, determining whether a condition for preferentially outputting scene information is met may include:

determining whether a preset priority corresponding to the second-type information acquisition device is higher than a predetermined priority threshold; if the preset priority corresponding to the second-type information acquisition device is higher than the predetermined priority threshold, determining that the condition for preferentially outputting scene information is met; if the preset priority corresponding to the second-type information acquisition device is not higher than the predetermined priority threshold, determining that the condition for preferentially outputting scene information is not met.

In the embodiment of the present application, priorities may be set only for various types of information acquisition devices, and a priority threshold is predetermined. When the preset priority corresponding to the second-type information acquisition device is higher than the predetermined priority threshold, it is determined that the condition for preferentially outputting scene information is met.

In the solution provided by the embodiment of the present application, when it is detected that the intelligent electronic door lock performs an operation for unlocking a door, a target user behavior type corresponding to the operation for unlocking the door is determined, and the target user concern data corresponding to the target user behavior type is obtained based on the preset data correspondence; then, based on the target user concern data, the prompt information is generated and output. It can be seen that in the solution provided by the embodiment of the present application, an information prompt function for the user concern data is added to the intelligent door lock system, thereby adding humanized functions, and solving the problem that the intelligent door lock system has the single humanized function. In addition, by further adding the scene information of the information acquisition devices, the humanized functions may be further added.

The method for information prompt of the present application is introduced with respect to another specific embodiment below.

The method for information prompt provided in the embodiment of the present application is applied to an intelligent door lock system. Specifically, the method for information prompt may be performed by an apparatus for information prompt. The specific device on which the apparatus for information prompt runs refers to related description in the foregoing embodiment including S101-S104.

Figure 4:
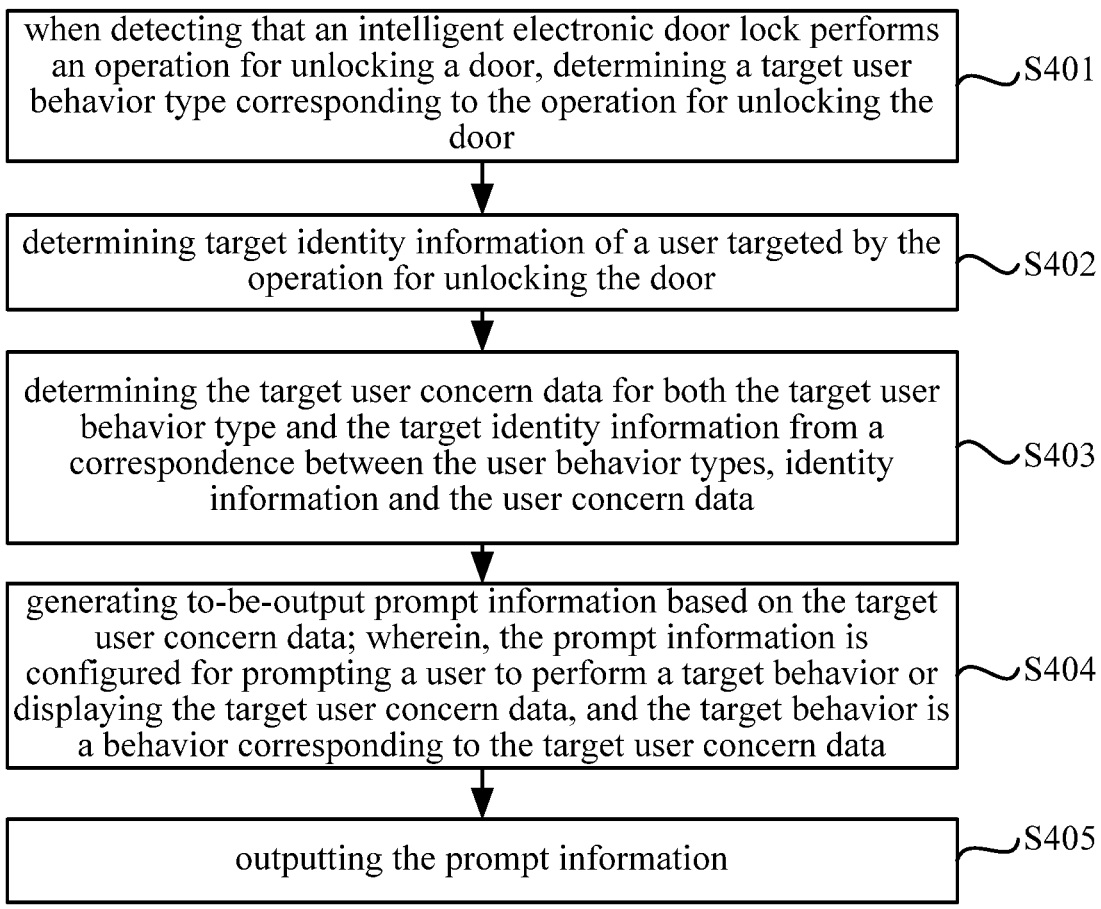
FIG. 4 is a flowchart of a method for information prompt shown in another exemplary embodiment of the present application.

As shown in FIG. 4, an embodiment of the present application provides a method for information prompt. The method includes steps S401-S405.

At S401, when it is detected that the intelligent electronic door lock performs an operation for unlocking a door, a target user behavior type corresponding to the operation for unlocking the door is determined.

The target user behavior type is the user entering the door or the user going out the door.

S401 in the present embodiment is the same as S101 in the above embodiment, and will be not described in detail herein.

At S402, target identity information of a user targeted by the operation for unlocking the door is determined.

In order to make the output prompt information more targeted, when different users enter the door or different users go out the door, prompt information matching a user who currently enters or goes out the door is output. Therefore, when it is detected that the intelligent electronic door lock performs the operation for unlocking the door, the apparatus for information prompt may identify the target identity information of the user targeted by the operation for unlocking the door, before the target user concern data is determined.

Optionally, for an intelligent door lock system associated with a biometric information detection module, the step of identifying target identity information of a user targeted by the operation for unlocking the door includes:

obtaining target biometric information of the user targeted by the operation for unlocking the door, and determining the target identity information corresponding to the target biometric information from a mapping relationship between biometric information and identity information; wherein, the target biometric information is information acquired by a biometric information detection module associated with the intelligent door lock system.

The biometric information detection module may include one or more of a fingerprint acquisition module, a voiceprint identification module, a finger vein identification module, a palmprint identification module, a face identification module, and the like. The face identification module may be an image acquisition module in the intelligent electronic door lock, or an image acquisition module that is connected with the intelligent door lock system, such as a camera installed outside the door.

In case biometric features are used to unlock the door, in order to verify the unlocking of the door, the apparatus for information prompt may obtain the target biometric information of the user targeted by the operation for unlocking the door, which is acquired by the biometric information detection module. In addition, since it is not necessary to perform a verification operation when the user goes out the door, the identity of the user may be identified by the image acquisition module and/or the wireless detector when the user goes out the door. Of course, the present application is not limited to this.

Optionally, for an intelligent door lock system that is not associated with a biometric information detection module, since a mobile communication device, such as an intelligent phone, has become an indispensable tool for users, an associated wireless detector may be disposed for the intelligent door lock system to detect the MAC address of the communication device of the user. Accordingly, the step of determining target identity information of a user targeted by the operation for unlocking the door may include:

obtaining a target MAC address of a communication device of the user targeted by the operation for unlocking the door, and determining the target identity information corresponding to the target MAC address from a mapping relationship between MAC addresses and identity information; wherein, the target MAC address is detected by a wireless detector associated with the intelligent door lock system.

The wireless detector may be a wireless probe, such as a wifi probe. The wireless detector may be integrated in the intelligent electronic door lock in the intelligent door lock system; or may exist independently and communicate with the intelligent door lock system; or may be integrated in other devices that communicate with the intelligent door lock system, such as a camera.

In addition, identity recognition may be performed by the biometric information detection module, or the wireless detector. Furthermore, the identity recognition is performed by the combination of the biometric information detection module and the wireless detector, to ensure the accuracy of the identity recognition. On the premise of ensuring that the apparatus for information prompt can obtain the information required for the information prompt, there are many ways to associate the biometric information detection module and the wireless detector with the intelligent door lock system, which are not limited in the embodiment of the present application.

At S403, the target user concern data for both the target user behavior type and the target identity information is determined from the correspondence between the user behavior types, the identity information and the user concern data.

Since data contents concerned by different users are different, the correspondence is the correspondence between the user behavior types, the identity information and the user concern data. The generation manner and storage location for the correspondence between the user behavior types, the identity information and the user concern data may refer to the related description about the correspondence between the user behavior types and the user concern data in S302 in the above embodiment.

For example, in this embodiment, the correspondence between the user behavior types, the identity information and the user concern data may be shown in Table 1.

TABLE 1

| user identity | user behavior type | user concern data |
| --- | --- | --- |
| old people A | go out the door | take medicine |
| old people A | enter the door | Do you bring everything back |
| nurse | go out the door | the breakfast needs to be ready before 7:30 |
| nurse | enter the door | Is the breakfast ready |
| child | go out the door | pay attention to get everything before going out the door |
| child | enter the door | pay attention to the homework |

The correspondence shown in the above Table 1 is merely an example, and is not intended to limit the embodiment of the present application. The correspondence between the user behavior types, the identity information and the user concern data may be obtained through manual setting or machine learning. For example, the correspondence is obtained cooperatively by the intelligent electronic door lock of the intelligent door lock system and the associated image acquisition device, and so on.

At S404, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

In this embodiment, S404 is the same as S303 in the above embodiment, and will be not described in detail herein.

At S405, the prompt information is output.

There may be multiple manners for outputting the prompt information. For example, the apparatus for information prompt directly outputs the prompt information via the voice output module of the intelligent door lock system, or outputs the prompt information to the associated mobile terminal. For example, the apparatus for information prompt may output the prompt information to the associated mobile terminal in the form of short message, email, or by dedicated client software, and the like.

The prompt information may be output for all users in a unified form. The prompt information may be output to the related users by different output manners. Then, in this embodiment, in the correspondence between the user behavior types, the identity information and the user concern data, the output manner for the prompt information may be also set, such as voice, short message, client message, email, and the like. In addition, if the prompt information is output in the form of short message, client message, email and the like, the communication device or account as the receiver of the information may be bound.

In addition, the intelligent door lock system may be associated with at least one information acquisition device via a gateway device. In order to add humanized functions, before the step of outputting the prompt information, the method may further include:

obtaining second-type scene information transmitted by a second-type information acquisition device; wherein, the second-type information acquisition device is an information acquisition device corresponding to the target user behavior type.

Accordingly, the step of outputting the prompt information may include:

outputting the second-type scene information and the prompt information.

The specific output manner of the second-type scene information and the prompt information may refer to the related content in S304 in the above embodiment, which will not be described in detail herein.

It can be seen that in the solution provided by the embodiment of the present application, an information prompt function for the user concern data is added to the intelligent door lock system, and the information prompt is targeted, thereby adding humanized functions, and solving the problem that the intelligent door lock system has the single humanized function. In addition, by further adding the scene information of the information acquisition devices, the humanized functions may be further added.

The method for information prompt of the present application is introduced with respect to another specific embodiment below.

The method for information prompt provided in the embodiment of the present application is applied to an intelligent door lock system. Specifically, the method for information prompt may be performed by an apparatus for information prompt. The specific device on which the apparatus for information prompt runs refers to related description in the foregoing embodiment including S101-S104.

Figure 5:
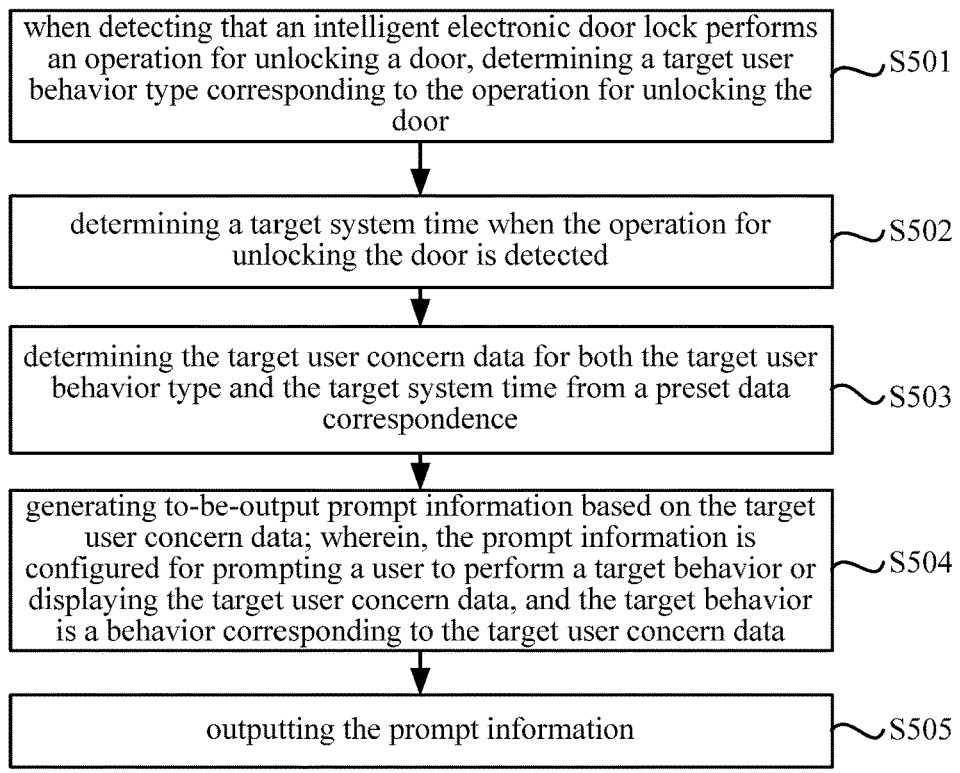
FIG. 5 is a flowchart of a method for information prompt shown in another exemplary embodiment of the present application.

As shown in FIG. 5, an embodiment of the present application provides a method for information prompt. The method includes the following steps.

At S501, when it is detected that the intelligent electronic door lock performs an operation for unlocking a door, a target user behavior type corresponding to the operation for unlocking the door is determined.

The target user behavior type is the user entering the door or the user going out the door.

In this embodiment, S501 is the same as S101 in the above embodiment, and will be not described in detail herein.

At S502, a target system time when the operation for unlocking the door is detected is determined.

In order to make the output prompt information more targeted, for different time periods in which a user enters the door or a user goes out the door, the prompt information corresponding to a time period in which the user is entering or going out the door is output. Therefore, when it is detected that the intelligent electronic door lock performs the operation for unlocking the door, before the target user concern data is determined, the apparatus for information prompt may determine the target system time when the operation for opening the door is detected.

At S503, the target user concern data for both the target user behavior type and the target system time is determined from the correspondence between the user behavior types, the system time and the user concern data.

Since a user concerns different data in different time periods, the correspondence is a correspondence between user behavior types, system time and user concern data. The generation manner and storage location for the correspondence between the user behavior types, the system time and the user concern data may refer to the related description about the correspondence between the user behavior types and the user concern data in S302 in the above embodiment.

For example, in this embodiment, the correspondence between the user behavior types, the system time and the user concern data may be shown in Table 2.

TABLE 2

| time period | user behavior type | user concern data |
| --- | --- | --- |
| 8:00-12:59 | go out the door | take medicine |
| 8:00-12:59 | enter the door | open the window for ventilation |
| 13:00-17:00 | go out the door | Do you get everything |
| 13:00-17:00 | enter the door | Do you bring everything back |

The correspondence shown in the above Table 2 is merely an example, and is not intended to limit the embodiment of the present application. The correspondence between the user behavior types, the system time and the user concern data may be obtained through manual setting or machine learning. For example, the correspondence is obtained cooperatively by the intelligent electronic door lock of the intelligent door lock system and the associated image acquisition device, and the like.

At S504, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

In this embodiment, S504 is the same as S303 in the above embodiment, and will be not described in detail herein.

At S505, the prompt information is output.

In this embodiment, S505 is the same as S304 in the above embodiment, and will be not described in detail herein.

It can be seen that in the solution provided by the embodiment of the present application, an information prompt function for the user concern data is added to the intelligent door lock system, and information prompt is targeted, thereby adding humanized functions, and solving the problem that the intelligent door lock system has the single humanized function. In addition, by further adding the scene information of the information acquisition devices, the humanized functions may be further added.

The method for information prompt of the present application is introduced with respect to another specific embodiment below.

The method for information prompt provided in the embodiment of the present application is applied to an intelligent door lock system. Specifically, the method for information prompt may be performed by an apparatus for information prompt. The specific device on which the apparatus for information prompt runs refers to related description in the foregoing embodiment including S101-S104.

Figure 6:
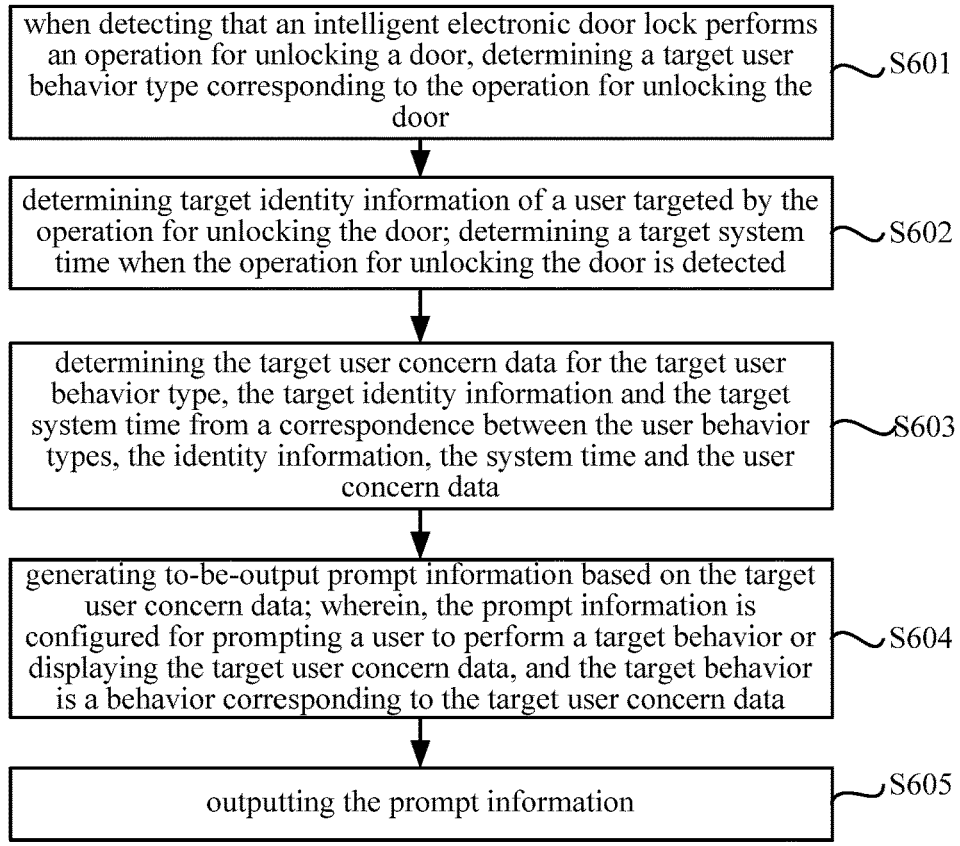
FIG. 6 is a flowchart of a method for information prompt shown in another exemplary embodiment of the present application.

As shown in FIG. 6, an embodiment of the present application provides a method for information prompt. The method includes the following steps.

At S601, when it is detected that an intelligent electronic door lock performs an operation for unlocking a door, a target user behavior type corresponding to the operation for unlocking the door is determined.

The target user behavior type is the user entering the door or the user going out the door.

In this embodiment, S601 is the same as S101 in the above embodiment, and will be not described in detail herein.

At S602, target identity information of a user targeted by the operation for unlocking the door is determined, and a target system time when the operation for unlocking the door is detected is determined.

In order to make the output prompt information more targeted, when different users enter the door or goes out the door in different time periods, the prompt information for both a user that is entering or going out the door and a time period in which the user is entering or going out the door is output. Therefore, when it is detected that the intelligent door lock system performs the operation for unlocking the door, before the target user concern data is determined, the apparatus for information prompt may determine the target identity information of the user targeted by the operation for unlocking the door, and determine the target system time when the operation for unlocking the door is detected.

The specific implementation of determining the target identity information of the user targeted by the operation for unlocking the door may refer to related content of S402. The specific implementation of determining the target system time when the operation for unlocking the door is detected may refer to related content of S502. They will be not described in detail herein.

At S603, the target user concern data for the target user behavior type, the target identity information and the target system time is determined from a correspondence between user behavior types, identity information, system time and user concern data.

Since different users concern different data in different time periods, the correspondence is a correspondence between user behavior types, identity information, system time and user concern data. The generation manner and storage location for the correspondence between user behavior types, identity information, system time and user concern data may refer to the related description about the correspondence between user behavior types and user concern data in S302 in the above embodiment.

For example, in this embodiment, the correspondence between user behavior types, identity information, system time and user concern data may be shown in Table 3.

TABLE 3

| user identity | time period | user behavior type | user concern data |
| --- | --- | --- | --- |
| old people A | 05:30-06:30 | go out the door | remember to take medicine before going out the door |
| old people A | 06:30-07:30 | enter the door | Do you bring everything back |
| nurse | 06:30-07:00 | go out the door | the breakfast needs to be ready before 7:30 |
| nurse | 07:00-07:30 | enter the door | Is the breakfast ready |

The correspondence shown in the above Table 3 is merely an example, and is not intended to limit the embodiment of the present application. The correspondence between user behavior types, identity information, system time and user concern data may be obtained through manual setting or machine learning. For example, the correspondence is obtained cooperatively by the intelligent electronic door lock of the intelligent door lock system and the associated image acquisition device, and the like.

At S604, to-be-output prompt information is generated based on the target user concern data; wherein, the prompt information is configured for prompting a user to perform a target behavior or displaying the target user concern data, and the target behavior is a behavior related to the target user concern data.

The target behavior is a behavior corresponding to the target user concern data.

In this embodiment, S604 is the same as S303 in the above embodiment, and will be not described in detail herein.

At S605, the prompt information is output.

In this embodiment, S605 is the same as S405 in the above embodiment, and will be not described in detail herein.

It can be seen that in the solution provided by the embodiment of the present application, an information prompt function for the user concern data is added to the intelligent door lock system, and information prompting is targeted, thereby adding humanized functions, and solving the problem that the intelligent door lock system has the single humanized function. In addition, by further adding the scene information of the information acquisition devices, the humanized functions may be further added.

The method for information prompt of the present application is introduced with respect to a specific application embodiment.

The method for information prompt is performed by an apparatus for information prompt, and the apparatus for information prompt is a functional software runs on the intelligent electronic door lock. In addition, the intelligent electronic door lock is a fingerprint-unlocked door lock, pre-establishes the correspondence between user behavior types, identity information, system time, user concern data, and information output manners, pre-establishes the correspondence between the behavior of the user going out the door and the fuel gas sensor, and the correspondence between the behavior of the user entering the door and the camera. The priorities of the camera and the fuel gas sensor are higher than the priority of the prompt information. The correspondence between user behavior types, identity information, system time, user concern data, and information output manners are shown in Table 4.

TABLE 4

| people | time (date, time) | behavior | user concern data and information output manner |
|---|---|---|---|
| old people A | 05:30-6:30 | go out the door | a voice or a short message, etc.: remember to take medicine before going out the door |
| | 6:30-7:00 | enter the door | a voice or a short message, etc.: Do you bring everything back? |
| nurse | Monday to Friday: 6:30-7:00 | go out the door | a voice or a short message, etc.: the breakfast needs to be ready before 7:30 |
| | Monday to Friday: 7:00-7:30 | enter the door | a voice or a short message, etc.: Is the breakfast ready? |
| child | Monday to Friday: 7:30-8:00 | go out the door | a voice or a short message, etc.: get everything before going out the door |
| | Monday to Sunday: 21:00-06:00 | go out the door | send a voice or a short message to the parent: the child goes out the door at abnormal time, please pay attention to check. |

Figure 7:
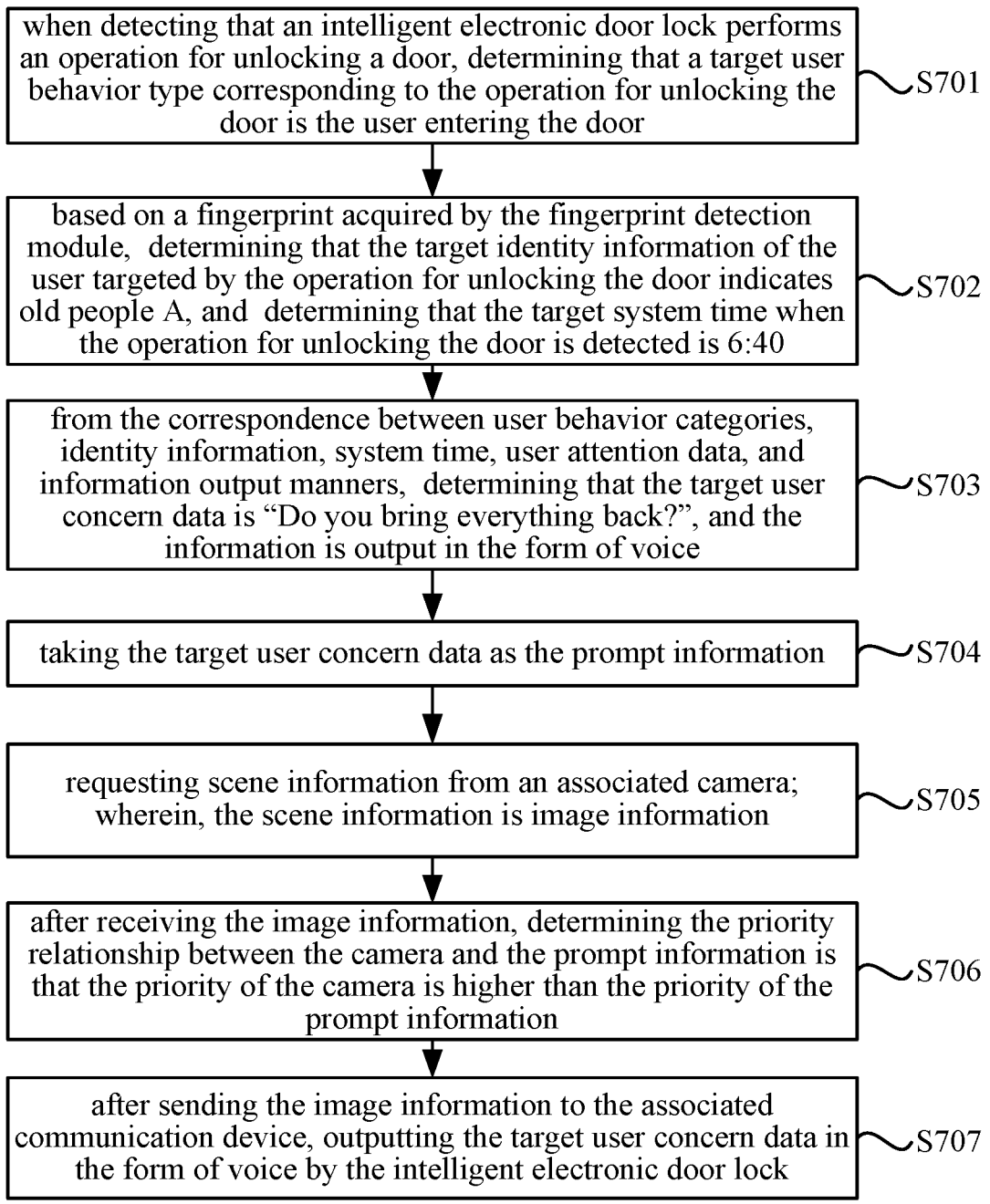
FIG. 7 is a flowchart of a method for information prompt shown in another exemplary embodiment of the present application.

As shown in FIG. 7, an embodiment of the present application provides a method for information prompt. The method includes the following steps.

At S701, when it is detected that an intelligent electronic door lock performs an operation for unlocking a door, it is determined that a target user behavior type corresponding to the operation for unlocking the door is the user entering the door.

The apparatus for information prompt determines that the operation for unlocking the door is an operation performed when an exterior lock of the intelligent electronic door lock acquires data and the data is verified successfully. Therefore, the apparatus for information prompt determines that the target user behavior type is the user entering the door.

The apparatus for information prompt may detect whether the door is unlocked by a square tongue, an oblique tongue, a step tongue and/or a door magnet of the intelligent electronic door lock, that is, detect whether the intelligent electronic door lock performs the operation for unlocking the door by the square tongue, the oblique tongue, the stop tongue and/or the door magnet of the intelligent electronic door lock.

At S702, based on a fingerprint acquired by the fingerprint detection module, it is determined that the target identity information of the user targeted by the operation for unlocking the door indicates old people A, and it is determined that the target system time when the operation for unlocking the door is detected is 6:40.

At S703, from the correspondence between user behavior types, identity information, system time, user concern data, and information output manners, it is determined that the target user concern data is "Do you bring everything back?", and the information is output in the form of voice.

At S704, the target user concern data is used as the prompt information.

At S705, scene information is requested from an associated camera; wherein, the scene information is image information.

When detecting that there is a danger indoors, the camera feeds back the acquired image information indicating that there is a danger indoors to the intelligent electronic door lock. When detecting that there is no danger indoors, the camera does not feed beak the image information to the intelligent electronic door lock.

At S706, after receiving the image information, it is determined the priority relationship between the camera and the prompt information is that the priority of the camera is higher than the priority of the prompt information.

At S707, after sending the image information to the associated communication device, the target user concern data is output in the form of voice by the intelligent electronic door lock.

It can be seen that in the solution provided by the embodiment of the present application, an information prompt function for the user concern data is added to the intelligent door lock system, and the information prompting is targeted, thereby adding humanized functions, and solving the problem that the intelligent door lock system has the single humanized function. In addition, by further adding the scene information of the information acquisition devices, the humanized functions may be further added.

Corresponding to the embodiment of the above method, an embodiment of the present application further provides an apparatus for information prompt, which is applied to the intelligent door lock system. In the case where the control function of the intelligent door lock system is independently implemented by the intelligent electronic door lock, the apparatus for information prompt may be a functional software runs on the intelligent electronic door lock. In the case where the control function of the intelligent door lock system is implemented cooperatively by the intelligent electronic door lock and the corresponding server device, the apparatus for information prompt may be a functional software runs on the intelligent electronic door lock or a functional software runs on the server device.

Figure 8:
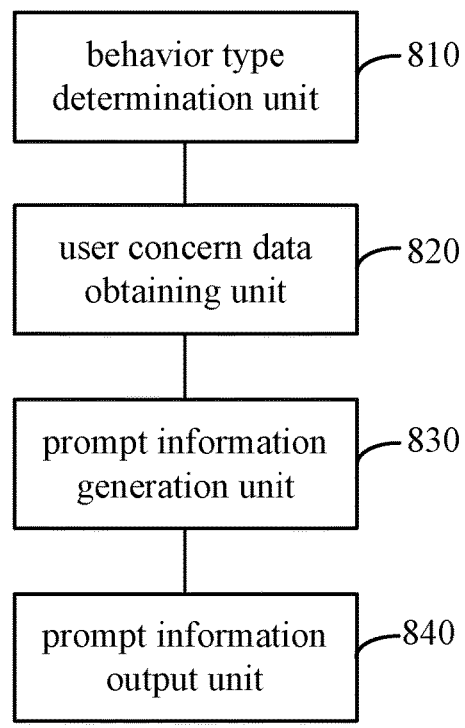
FIG. 8 is a schematic structural diagram of an apparatus for information prompt shown in an exemplary embodiment of the present application.

As shown in FIG. 8, the apparatus for information prompt provided by the present application may include:

a behavior type determination unit 810, configured for: when detecting that an intelligent electronic door lock performs an operation for unlocking a door, determining a target user behavior type corresponding to the operation for unlocking the door;

a user concern data obtaining unit 820, configured for: obtaining target user concern data corresponding to the target user behavior type;

a prompt information generation unit 830, configured for: generating to-be-output prompt information based on the target user concern data; wherein, the prompt information is configured for prompting a user to perform a target behavior or displaying the target user concern data, and the target behavior is a behavior corresponding to the target user concern data; and a prompt information output unit 840, configured for: outputting the prompt information.

It can be seen that in the solution provided by the embodiment of the present application, an information prompt function for the user concern data is added to the intelligent door lock system, thereby adding humanized functions, and solving the problem that the intelligent door lock system has the single humanized function.

Optionally, the user concern data obtaining unit 820 may include:

an information obtaining subunit, configured for: obtaining first-type scene information transmitted by a first-type information acquisition device; wherein, the first-type information acquisition device is an information acquisition device corresponding to the target user behavior type; and a first user concern data obtaining subunit, configured for: determining the first-type scene information as the target user concern data.

Optionally, the user concern data obtaining unit 820 may include:

a second user concern data obtaining subunit, configured for: determining the target user concern data corresponding to the target user behavior type from a correspondence between user behavior types and user concern data.

Optionally, in addition to the behavior type determination unit 810, the second user concern data obtaining subunit, the prompt information generation unit 830, and the prompt information output unit 840, the apparatus for information prompt provided in the embodiment of the present application may further include:

an identity recognition unit, configured for: determining target identity information of a user targeted by the operation for unlocking the door, before the second user concern data obtaining subunit determines the target user concern data corresponding to the target user behavior type from the correspondence between user behavior types and user concern data.

Correspondingly, the second user concern data obtaining subunit may include:

a first data obtaining module, configured for: determining the target user concern data for both the target user behavior type and the target identity information from a correspondence between the user behavior types, identity information and the user concern data.

Optionally, in addition to the behavior type determination unit 810, the second user concern data obtaining subunit, the prompt information generation unit 830, and the prompt information output unit 840, the apparatus for information prompt provided in the embodiment of the present application may further include:

a first system time obtaining unit, configured for: determining a target system time when the operation for unlocking the door is detected, before the second user concern data obtaining subunit determines the target user concern data corresponding to the target user behavior type from the correspondence between user behavior types and user concern data.

Correspondingly, the second user concern data obtaining subunit may include:

a second data obtaining module, configured for: determining the target user concern data for both the target user behavior type and the target system time from a correspondence between the user behavior types, system time and the user concern data.

Optionally, in addition to the behavior type determination unit 810, the identity recognition unit, the first data obtaining module, the prompt information generation unit 830, and the prompt information output unit 840, the apparatus for information prompt provided in the embodiment of the present application may further include:

a second system time obtaining unit, configured for: determining a target system time when the operation for unlocking the door is detected, before the first data obtaining module determines the target user concern data for both the target user behavior type and the target identity information from the correspondence between the user behavior types, the identity information and the user concern data.

Correspondingly, the first data obtaining module may include:

a data obtaining submodule, configured for: determining the target user concern data for the target user behavior type, the target identity information and the target system time from a correspondence between the user behavior types, the identity information, the system time and the user concern data.

Optionally, in addition to the behavior type determination unit 810, the second user concern data obtaining subunit, the prompt information generation unit 830, and the prompt information output unit 840, the apparatus for information prompt provided in the embodiment of the present application may further include:

an information obtaining unit, configured for: obtaining second-type scene information transmitted by a second-type information acquisition device, before the prompt information output unit outputs the prompt information; wherein, the second-type information acquisition device is an information acquisition device corresponding to the target user behavior type.

The prompt information output unit 840 may include:

a prompt information output subunit, configured for: outputting the second-type scene information and the prompt information.

Optionally, the prompt information output subunit may include:

a judgment module, configured for: determining whether a condition for preferentially outputting scene information is met; if the condition for preferentially outputting scene information is met, triggering a first processing module; if the condition for preferentially outputting scene information is not met, triggering a second processing module;

the first processing module, configured for: outputting the second-type scene information and the prompt information in a first output order; wherein, the first output order is that the second-type scene information is output first and then the prompt information is output; and the second processing module, configured for: outputting the second-type scene information and the prompt information in a second output order; wherein, the second output order is that the prompt information is output first and then the second-type scene information is output.

Optionally, the judgment module may include:

a first judgment submodule, configured for: determining whether a preset priority corresponding to the second-type information acquisition device is higher than a predetermined priority threshold; wherein, if the preset priority corresponding to the second-type information acquisition device is higher than the predetermined priority threshold, it is indicated that the condition for preferentially outputting scene information is met; and if the preset priority corresponding to the second-type information acquisition device is not higher than the predetermined priority threshold, it is indicated that the condition for preferentially outputting scene information is not met;

or, a second judgment submodule, configured for: determining whether a preset priority corresponding to the second-type information acquisition device is higher than a preset priority corresponding to the prompt information; wherein, if the preset priority corresponding to the second-type information acquisition device is higher than the preset priority corresponding to the prompt information, it is indicated that the condition for preferentially outputting scene information is met; if the preset priority corresponding to the second-type information acquisition device is not higher than the preset priority corresponding to the prompt information, it is indicated that the condition for preferentially outputting scene information is not met.

Optionally, the behavior type determination unit 810 may include:

a first type determination subunit, configured for: when the operation for unlocking the door is a first predetermined operation, or when an image acquisition module associated with the intelligent door lock system identifies first predetermined information, determining that the target user behavior type corresponding to the operation for unlocking the door is the user entering the door; wherein, the first predetermined operation is an operation performed when an exterior lock of the intelligent electronic door lock acquires data and the data is verified successfully; the first predetermined information is an image in which the user is located outside the door before the operation for unlocking the door is performed; and a second type determination subunit, configured for: when the operation for unlocking the door is a second predetermined operation, or when the image acquisition module associated with the intelligent door lock system identifies second predetermined information, determining that the target user behavior type corresponding to the operation for unlocking the door is the user going out the door; wherein, the second predetermined operation is an operation triggered by a handle of an inner lock of the intelligent electronic door lock; the second predetermined information is an image in which the user is located outside the door after the operation for unlocking the door is performed.

Optionally, the identity identification unit may include:

a first identity recognition subunit, configured for: obtaining target biometric information of the user targeted by the operation for unlocking the door, and determining the target identity information corresponding to the target biometric information from a mapping relationship between biometric information and the identity information; wherein, the target biometric information is acquired by a biometric information detection module associated with the intelligent door lock system;

or, a second identity identification subunit, configured for: obtaining a target MAC address of a communication device of the user targeted by the operation for unlocking the door, and determining the target identity information corresponding to the target MAC address from a mapping relationship between MAC addresses and the identity information; wherein, the target MAC address is detected by a wireless detector associated with the intelligent door lock system.

Figure 9:
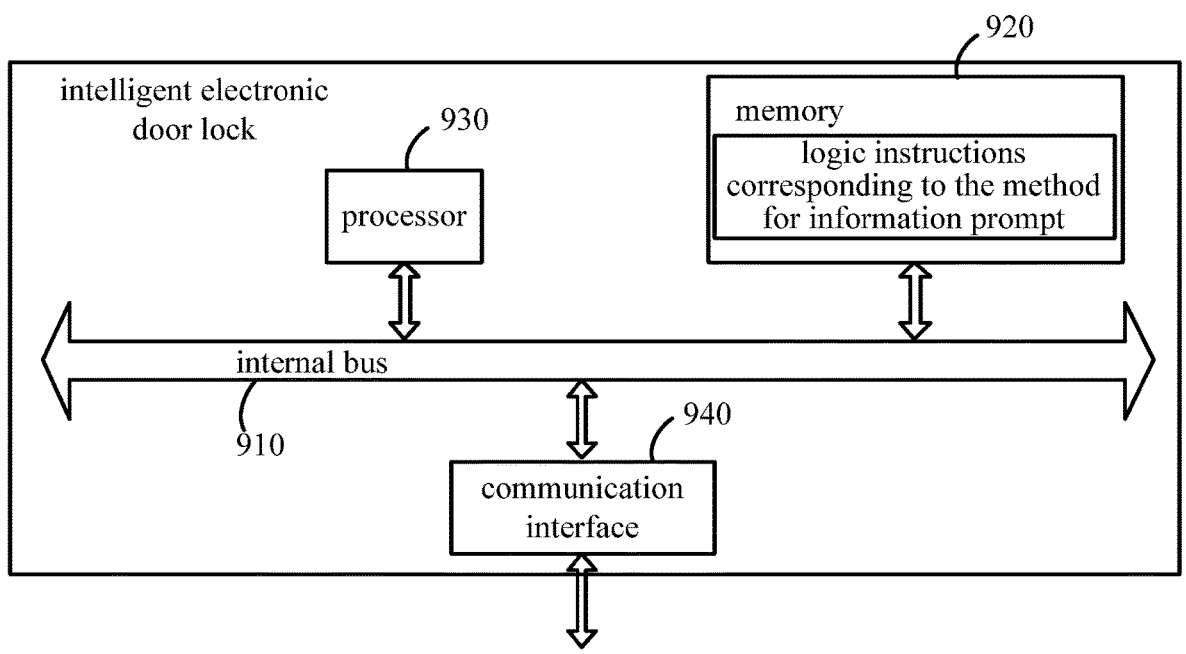
FIG. 9 is a schematic structural diagram of an intelligent electronic door lock shown in an exemplary embodiment of the present application.

In addition, corresponding to the above embodiment of the method, the present application further provides an intelligent electronic door lock. As shown in FIG. 9, the intelligent electronic door lock may include: an internal bus 910, a memory 920, a processor 930, and a communication interface 940; wherein, the processor 930, the communication interface 940, and the memory 920 communicate with each other via the internal bus 910.

The memory 920 is configured for storing machine-readable instructions for the method for information prompt.

The processor 930 is configured for reading the machine-readable instructions in the memory 920 and executing the machine-readable instructions to perform operations of:

when detecting that the intelligent electronic door lock performs an operation for unlocking a door, determining a target user behavior type corresponding to the operation for unlocking the door;

obtaining target user concern data corresponding to the target user behavior type;

generating to-be-output prompt information based on the target user concern data; wherein, the prompt information is configured for prompting a user to perform a target behavior or displaying the target user concern data, and the target behavior is a behavior corresponding to the target user concern data; and outputting the prompt information.

The related description of the specific steps of the method for information prompt may refer to the description in the embodiment of the method for information prompt provided in the embodiment of the present application, which will be not described in detail herein.

The memory 920 may be, for example, a non-volatile memory. The processor 930 may call logic instructions for the method for information prompt in the memory 920 to perform the method for information prompt.

It can be seen that in the solution provided by the embodiment of the present application, an information prompt function for the user concern data is added to the intelligent door lock system, thereby adding humanized functions, and solving the problem that the intelligent door lock system has the single humanized function.

Figure 10:
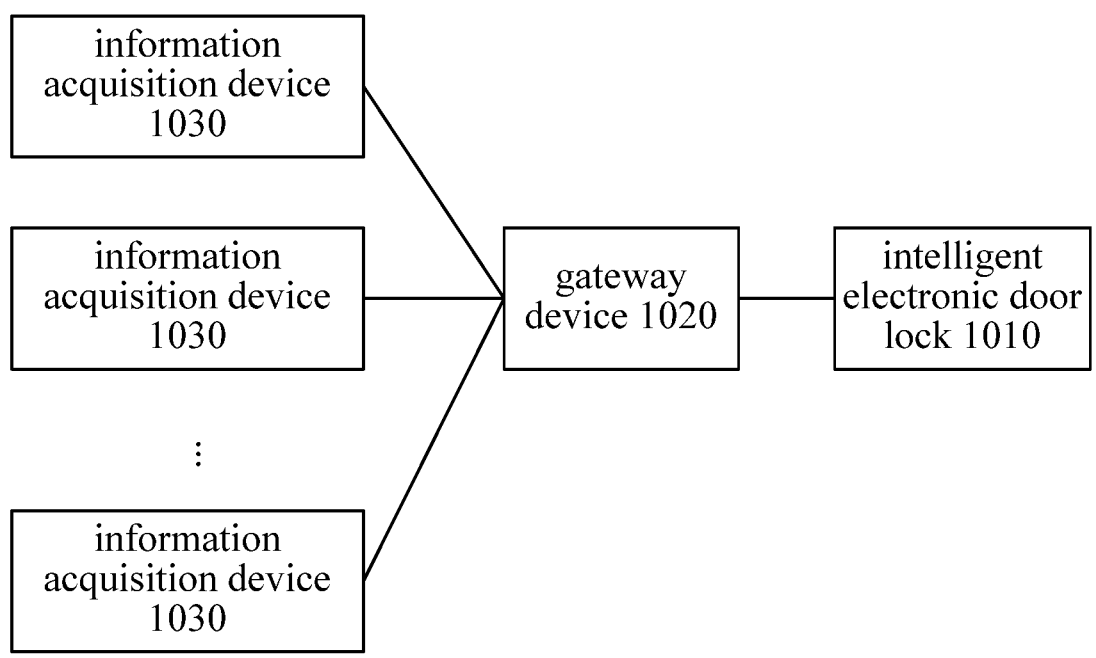
FIG. 10 is a schematic structural diagram of a system for information prompt shown in an exemplary embodiment of the present application.

In addition, an embodiment of the present application further provides a system for information prompt. As shown in FIG. 10, the system for information prompt may include: an intelligent electronic door lock 1010, a gateway device 1020 and at least one information acquisition device 1030.

The gateway device 1020 is configured for establishing a communication connection between the intelligent electronic door lock and the at least one information acquisition device.

The at least one information acquisition device 1030 is configured for acquiring scene information of a scene in which the at least one information acquisition device is located.

The intelligent electronic door lock 1010 is configured for:

when it is detected that the intelligent electronic door lock performs an operation for unlocking a door, determining a target user behavior type corresponding to the operation for unlocking the door;

obtaining first-type scene information transmitted by a first-type information acquisition device; wherein, the first-type information acquisition device is an information acquisition device, in the at least one information acquisition device, corresponding to the target user behavior type;

determining the first-type scene information as the target user concern data;

generating to-be-output prompt information based on the target user concern data; wherein, the prompt information is configured for prompting a user to perform a target behavior or displaying the target user concern data, and the target behavior is a behavior corresponding to the target user concern data; and outputting the prompt information.

The information acquisition device 1030 includes, but is not limited to, a humidity sensor for detecting the humidity, a temperature sensor for detecting the temperature, a camera for acquiring the image information, a smoke sensor for detecting the smoke concentration, a fuel gas sensor for detecting the fuel gas concentration, and the like; and the gateway device 1020 may be a device such as a switch or a router.

In this embodiment, a specific implementation and related description of the steps performed by the intelligent electronic door lock 1010 may refer to related content in the above embodiment of the method for information prompt, which will be not described in detail herein.

It can be seen that in the solution provided by the embodiment of the present application, an information prompt function for the user concern data belonging to the scene information is added to the intelligent door lock system, thereby adding humanized functions, and solving the problem that the intelligent door lock system has the single humanized function.

In addition, an embodiment of the present application further provides a system for information prompt. The system for information prompt may include: an intelligent electronic door lock, a gateway device and at least one information acquisition device.

The gateway device is configured for establishing a communication connection between the intelligent electronic door lock and the at least one information acquisition device.

The at least one information acquisition device is configured for acquiring scene information of a scene in which the at least one information acquisition device is located.

The intelligent electronic door lock is configured for:

when it is detected that the intelligent electronic door lock performs an operation for unlocking a door, determining a target user behavior type corresponding to the operation for unlocking the door;

determining target user concern data corresponding to the target user behavior type from a correspondence between user behavior types and user concern data;

generating to-be-output prompt information based on the target user concern data; wherein, the prompt information is configured for prompting a user to perform a target behavior or displaying the target user concern data, and the target behavior is a behavior corresponding to the target user concern data;

obtaining second-type scene information transmitted by a second-type information acquisition device; wherein, the second-type information acquisition device is an information acquisition device, in the at least one information acquisition device, corresponding to the target user behavior type; and outputting the second-type scene information and the prompt information.

A schematic structural diagram of a system for information prompt provided in the present embodiment may refer to FIG. 10.

In this embodiment, a specific implementation and related description of the steps performed by the intelligent electronic door lock may refer to related content in the above embodiment of the method for information prompt, which will be not described in detail herein.

It can be seen that in the solution provided by the embodiment of the present application, an information prompt function for the user concern data is added to the intelligent door lock system, thereby adding humanized functions, and solving the problem that the intelligent door lock system has the single humanized function. In addition, by further adding the scene information of the information acquisition devices, the humanized functions may be further added.

Optionally, in addition to the intelligent electronic door lock, the gateway device, and the at least one information acquisition device, the system for information prompt provided in the embodiment of the present application may further include a mobile terminal;

the mobile terminal is configured for generating the correspondence between user behavior types and user concern data based on a received user instruction, and receiving and outputting the second-type scene information and the prompt information sent by the intelligent electronic door lock.

The intelligent electronic door lock is further configured for determining the target user concern data corresponding to the target user behavior type from the correspondence between user behavior types and user concern data generated by the mobile terminal; and, is further configured for outputting the second-type scene information and the prompt information to the mobile terminal.

In specific applications, the mobile terminal may be an intelligent phone, a tablet computer, or the like.

In the embodiment of the present application, the mobile terminal may output an interface for configuring the correspondence, so that a user may manually configure the user behavior types and the corresponding user concern data through the interface. After the configuration is completed, a user instruction carrying the configured content is sent, for example, by clicking a submit button or a save button, so that the mobile terminal may generate the correspondence between the user behavior types and the user concern data based on the received user instruction.

After generating the correspondence between the user behavior types and the user concern data, the mobile terminal may send the correspondence to the intelligent electronic door lock for storage, so that during information prompting, the intelligent electronic door lock directly uses the correspondence stored by itself to obtain the target user concern data.

After generating the correspondence between the user behavior types and the user concern data, the mobile terminal may also store the correspondence. The intelligent electronic door lock sends a data request carrying the target user behavior type to the mobile terminal during information prompting. After receiving the data request, the mobile terminal determines the target user concern data corresponding to the target user behavior type from the correspondence between the user behavior types and the user concern data, and feeds beak the determined target user concern data to the intelligent electronic door lock.

Optionally, in addition to the intelligent electronic door lock, the gateway device, and the at least one information acquisition device, the system for information prompt provided in the embodiment of the present application may further include a cloud server.

The cloud server is configured for storing the correspondence between user behavior types and user concern data, determining the target user concern data corresponding to the target user behavior type from the correspondence between user behavior types and user concern data after receiving a data request carrying the target user behavior type sent by the intelligent electronic door lock, and feeding back the target user concern data to the intelligent electronic door lock.

The intelligent electronic door lock is further configured for sending the data request carrying the target user behavior type to the cloud server, and receiving the target user concern data fed beak by the cloud server.

In the embodiment of the present application, the correspondence between user behavior types and user concern data stored in the cloud server may be generated by the cloud server learning the historical information reported by the intelligent electronic door lock, or generated based on the configuration provided by the user.

For the correspondence generated based on the configuration provided by the user, the user may login the access web site corresponding to the cloud server, and then manually configure the user behavior types and the corresponding user concern data. In this way, the cloud server may generate and store the correspondence between the user behavior types and the user concern data based on the content configured by the user.

Of course, the system for information prompt may further include a mobile terminal. At this time, for the correspondence generated based on the configuration provided by the user, the mobile terminal may output an interface for correspondence configuration. Then, the user configures the user behavior types and the corresponding user concern data through the interface. After the configuration is completed, the mobile terminal may directly send the content configured by the user to the cloud server, so that the cloud server generates and stores the correspondence between the user behavior types and the user concern data. Alternatively, the mobile terminal may generate the correspondence based on the content configured by the user, and upload the correspondence to the cloud server.

Based on the above embodiment of the method for information prompt, an embodiment of the present application further provides a machine-readable storage medium for storing a computer program therein. The computer program is executed by a processor, so as to cause the processor to perform the above any one method for information prompt.

Based on the above embodiment of the method for information prompt, an embodiment of the present application further provides a computer program. The computer program is executed by a processor, so as to cause the processor to perform the above any one method for information prompt.

The embodiments of the apparatus for information prompt, the intelligent electronic door lock, the system for information prompt, the machine-readable storage medium and the computer program basically correspond to the embodiment of the method for information prompt. The relevant parts refer to the description of the embodiment of the method for information prompt. The apparatus embodiment described above is only exemplary. The units described as separate components may or may not be physically separated, and the components displayed as units may or may not be physical units, which may be located in one place, or may be distributed on multiple network units. Some or all of these modules may be selected based on actual needs to achieve the purpose of the present application. This can be understood and implemented by those skilled in the art without any creative effort.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for information prompt, which is applied to an intelligent door lock system, comprising:
   when detecting that an intelligent electronic door lock performs an operation for unlocking a door, determining a target user behavior type corresponding to the operation for unlocking the door, wherein the target user behavior type is a user entering the door or a user going out the door;
   obtaining target user concern data corresponding to the target user behavior type, wherein the target user concern data is scene information acquired by an information acquisition device that corresponds to the target user behavior type, wherein the information acquisition device corresponding to the target user behavior type comprises a camera, a humidity sensor, a temperature sensor, a smoke sensor or a fuel gas sensor and is installed indoors, wherein a correspondence between the behavior of the user going out the door and the fuel gas sensor, the temperature sensor and the humidity sensor and a correspondence between the behavior of the user entering the door and the camera, the smoke sensor and the fuel gas sensor are pre-established;

generating to-be-output prompt information based on the target user concern data; wherein, the prompt information is the scene information or information containing the scene information; and outputting the prompt information.

2. The method of claim 1, wherein, the step of obtaining target user concern data corresponding to the target user behavior type comprises:

obtaining scene information transmitted by an information acquisition device; wherein, the information acquisition device is an information acquisition device corresponding to the target user behavior type; and determining the scene information as the target user concern data.

3. The method of claim 1, wherein, the step of obtaining target user concern data corresponding to the target user behavior type comprises:

determining the target user concern data corresponding to the target user behavior type from a correspondence between user behavior types and user concern data.

4. The method of claim 3, wherein, before the step of determining the target user concern data corresponding to the target user behavior type from a correspondence between user behavior types and user concern data, the method further comprises:

determining target identity information of a user targeted by the operation for unlocking the door;

the step of determining the target user concern data corresponding to the target user behavior type from a correspondence between user behavior types and user concern data comprises:

determining the target user concern data for both the target user behavior type and the target identity information from a correspondence between the user behavior types, identity information and the user concern data.

5. The method of claim 3, wherein, before the step of determining the target user concern data corresponding to the target user behavior type from a correspondence between user behavior types and user concern data, the method further comprises:

determining a target system time when the operation for unlocking the door is detected;

the step of determining the target user concern data corresponding to the target user behavior type from a correspondence between user behavior types and user concern data comprises:

determining the target user concern data for both the target user behavior type and the target system time from a correspondence between the user behavior types, system time and the user concern data.

6. The method of claim 4, wherein, before the step of determining the target user concern data for both the target user behavior type and the target identity information from a correspondence between the user behavior types, identity information and the user concern data, the method further comprises:

determining a target system time when the operation for unlocking the door is detected;

the step of determining the target user concern data for the target user behavior type from a correspondence between the user behavior types, identity information and the user concern data comprises:

determining the target user concern data for the target user behavior type, the target identity information and the target system time from a correspondence between the user behavior types, the identity information, the system time and the user concern data.

7. The method of claim 3, wherein, before the step of outputting the prompt information, the method further comprises:

obtaining scene information transmitted by an information acquisition device; wherein, the information acquisition device is an information acquisition device corresponding to the target user behavior type;

the step of outputting the prompt information comprises:

outputting the scene information and the prompt information.

8. The method of claim 7, wherein, the step of outputting the scene information and the prompt information comprises:

determining whether a condition for preferentially outputting scene information is met;

if the condition for preferentially outputting scene information is met, outputting the scene information and the prompt information in a first output order; if the condition for preferentially outputting scene information is not met, outputting the scene information and the prompt information in a second output order; wherein, the first output order is that the scene information is output first and then the prompt information is output; the second output order is that the prompt information is output first and then the scene information is output.

9. The method of claim 8, wherein, the step of determining whether a condition for preferentially outputting scene information is met comprises:

determining whether a preset priority corresponding to the information acquisition device is higher than a predetermined priority threshold; if yes, determining that the condition for preferentially outputting scene information is met; if not, determining that the condition for preferentially outputting scene information is not met;

or, determining whether a preset priority corresponding to the information acquisition device is higher than a preset priority corresponding to the prompt information; if yes, determining that the condition for preferentially outputting scene information is met; if not, determining that the condition for preferentially outputting scene information is not met.

10. The method of claim 1, wherein, the step of determining a target user behavior type corresponding to the operation for unlocking the door comprises:

when the operation for unlocking the door is a first predetermined operation, or when an image acquisition module associated with the intelligent door lock system identifies first predetermined information, determining that the target user behavior type corresponding to the operation for unlocking the door is the user entering the door; wherein, the first predetermined operation is an operation performed when an exterior lock of the intelligent electronic door lock acquires data and the data is verified successfully; the first predetermined information is an image in which the user is located outside the door before the operation for unlocking the door is performed; and when the operation for unlocking the door is a second predetermined operation, or when the image acquisition module associated with the intelligent door lock system identifies second predetermined information, determining that the target user behavior type corresponding to the operation for unlocking the door is the user going out the door; wherein, the second predetermined operation is an operation triggered by a handle of an inner lock of the intelligent electronic door lock; the second predetermined information is an image in which the user is located outside the door after the operation for unlocking the door is performed.

11. The method of claim 4, wherein, the step of determining target identity information of a user targeted by the operation for unlocking the door comprises:
obtaining target biometric information of the user targeted by the operation for unlocking the door, and determining the target identity information corresponding to the target biometric information from a mapping relationship between biometric information and the identity information; wherein, the target biometric information is acquired by a biometric information detection module associated with the intelligent door lock system;
or, obtaining a target MAC address of a communication device of the user targeted by the operation for unlocking the door, and determining the target identity information corresponding to the target MAC address from a mapping relationship between MAC addresses and the identity information; wherein, the target MAC address is detected by a wireless detector associated with the intelligent door lock system.

12. An intelligent electronic door lock, comprising: an internal bus, a memory, a processor, and a communication interface; wherein, the processor, the communication interface and the memory communicate with each other via the internal bus;
wherein, the memory is configured for storing machine-readable instructions for a method for information prompt;
the processor is configured for reading the machine-readable instructions in the memory and executing the machine-readable instructions to perform operations of:
when it is detected that the intelligent electronic door lock performs an operation for unlocking a door, determining a target user behavior type corresponding to the operation for unlocking the door, wherein the target user behavior type is a user entering the door or a user going out the door;
obtaining target user concern data corresponding to the target user behavior type, wherein the target user concern data is scene information acquired by an information acquisition device corresponding to the target user behavior type, wherein the information acquisition device corresponding to the target user behavior type comprises a camera, a humidity sensor, a temperature sensor, a smoke sensor or a fuel gas sensor and is installed indoors, wherein a correspondence between the behavior of the user going out the door and the fuel gas sensor, the temperature sensor and the humidity sensor and a correspondence between the behavior of the user entering the door and the camera, the smoke sensor and the fuel gas sensor are pre-established;
generating to-be-output prompt information based on the target user concern data; wherein, the prompt information is the scene information or information containing the scene information; and
outputting the prompt information.

13. A system for information prompt, comprising: an intelligent electronic door lock, a gateway device and at least one information acquisition device; wherein,
the gateway device is configured for establishing a communication connection between the intelligent electronic door lock and the at least one information acquisition device;
the at least one information acquisition device is configured for acquiring scene information of a scene in which the at least one information acquisition device is located;
the intelligent electronic door lock is configured for:
when it is detected that the intelligent electronic door lock performs an operation for unlocking a door, determining a target user behavior type corresponding to the operation for unlocking the door, wherein the target user behavior type is a user entering the door or a user going out the door;
obtaining scene information transmitted by an information acquisition device; wherein, the information acquisition device is an information acquisition device, in the at least one information acquisition device, corresponding to the target user behavior type, wherein the information acquisition device corresponding to the target user behavior type comprises a camera, a humidity sensor, a temperature sensor, a smoke sensor or a fuel gas sensor and is installed indoors, wherein a correspondence between the behavior of the user going out the door and the fuel gas sensor, the temperature sensor and the humidity sensor and a correspondence between the behavior of the user entering the door and the camera, the smoke sensor and the fuel gas sensor are pre-established
determining the scene information as the target user concern data;
generating to-be-output prompt information based on the target user concern data; wherein, the prompt information is the scene information or information containing the scene information; and
outputting the prompt information.

14. A system for information prompt, comprising: an intelligent electronic door lock, a gateway device and at least one information acquisition device; wherein,
the gateway device is configured for establishing a communication connection between the intelligent electronic door lock and the at least one information acquisition device;
the at least one information acquisition device is configured for acquiring scene information of a scene in which the at least one information acquisition device is located;
the intelligent electronic door lock is configured for:
when it is detected that the intelligent electronic door lock performs an operation for unlocking a door, determining a target user behavior type corresponding to the operation for unlocking the door, wherein the target user behavior type is a user entering the door or a user going out the door;
determining target user concern data corresponding to the target user behavior type from a correspondence between user behavior types and user concern data;
generating to-be-output prompt information based on the target user concern data; wherein, the prompt information is the scene information or information containing the scene information;

obtaining scene information transmitted by an information acquisition device; wherein, the information acquisition device is an information acquisition device, in the at least one information acquisition device, corresponding to the target user behavior type, and wherein the information acquisition device corresponding to the target user behavior type comprises a camera, a humidity sensor, a temperature sensor, a smoke sensor or a fuel gas sensor and is installed indoors, wherein a correspondence between the behavior of the user going out the door and the fuel gas sensor, the temperature sensor and the humidity sensor and a correspondence between the behavior of the user entering the door and the camera, the smoke sensor and the fuel gas sensor are pre-established; and outputting the scene information and the prompt information.

15. The system of claim 14, further comprising a mobile terminal;

wherein, the mobile terminal is configured for generating the correspondence between the user behavior types and the user concern data based on a received user instruction, and receiving and outputting the scene information and the prompt information sent by the intelligent electronic door lock; and the intelligent electronic door lock is further configured for determining the target user concern data corresponding to the target user behavior type from the correspondence between the user behavior types and the user concern data generated by the mobile terminal; and is further configured for outputting the scene information and the prompt information to the mobile terminal.

16. The system of claim 14, further comprising a cloud server;

wherein, the cloud server is configured for storing the correspondence between the user behavior types and the user concern data, determining the target user concern data corresponding to the target user behavior type from the correspondence between the user behavior types and the user concern data, after receiving a data request carrying the target user behavior type from the intelligent electronic door lock; and feeding back the target user concern data to the intelligent electronic door lock; and the intelligent electronic door lock is further configured for sending the data request carrying the target user behavior type to the cloud server, and receiving the target user concern data fed beak by the cloud server.

17. A non-transitory machine-readable storage medium for storing a computer program therein; wherein, the computer program is executed by a processor, so as to cause the processor to perform the method of claim 1.

* * * * *